(12) United States Patent
Kessler

(10) Patent No.: US 9,851,938 B2
(45) Date of Patent: Dec. 26, 2017

(54) MICROPHONE ARRAYS AND COMMUNICATION SYSTEMS FOR DIRECTIONAL RECEPTION

(71) Applicant: Analog Devices, Inc, Norwood, MA (US)

(72) Inventor: Martin Kessler, Salem, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 0 days.

(21) Appl. No.: 15/139,238

(22) Filed: Apr. 26, 2016

(65) Prior Publication Data
US 2017/0308352 A1 Oct. 26, 2017

(51) Int. Cl.
*H04R 3/00* (2006.01)
*G06F 3/16* (2006.01)

(52) U.S. Cl.
CPC .............. *G06F 3/165* (2013.01); *H04R 3/005* (2013.01); *H04R 2430/21* (2013.01); *H04R 2499/13* (2013.01)

(58) Field of Classification Search
CPC ................................. G06F 3/165; H04R 3/005
See application file for complete search history.

(56) References Cited

U.S. PATENT DOCUMENTS

| | | | |
|---|---|---|---|
| 5,715,319 A | 2/1998 | Chu | |
| 2008/0317254 A1* | 12/2008 | Kano | G10K 11/1786 381/71.4 |
| 2010/0226210 A1* | 9/2010 | Kordis | G01S 5/0027 367/127 |
| 2012/0051548 A1* | 3/2012 | Visser | G10L 21/0208 381/56 |
| 2012/0275621 A1* | 11/2012 | Elko | H04R 19/016 381/92 |
| 2012/0330652 A1* | 12/2012 | Turnbull | G10L 21/02 704/226 |
| 2013/0343549 A1* | 12/2013 | Vemireddy | H04R 5/027 381/17 |

(Continued)

OTHER PUBLICATIONS

Application Note AN-1140, *Microphone Array Beamforming*, InvenSense, San Jose, CA, USA, AN-1140-00, Revision: 1.0, Release Date: Dec. 31, 2013, 12 pages.

(Continued)

*Primary Examiner* — Simon King
(74) *Attorney, Agent, or Firm* — Patent Capital Group

(57) ABSTRACT

Disclosed herein are microphone arrays for directional reception, along with related system, devices, and techniques. For example, a four-microphone array for directional signal reception may include first, second, and third microphones arranged such that projections of the first, second, and third microphones in a plane provide corners of a triangle in the plane. In some embodiments, a fourth microphone may be arranged such that a projection of the fourth microphone in the plane is disposed in an interior of the triangle. In other embodiments, the fourth microphone may be arranged such that the projection of the fourth microphone in the plane is disposed outside the interior of the triangle, and a distance between the first microphone and the second microphone is different from a distance between the first microphone and the third microphone.

20 Claims, 22 Drawing Sheets

(56) References Cited

U.S. PATENT DOCUMENTS

| | | | |
|---|---|---|---|
| 2014/0112104 A1* | 4/2014 | Calvarese | G01S 5/22 367/127 |
| 2014/0286504 A1* | 9/2014 | Iwai | H04R 1/028 381/86 |
| 2014/0337016 A1* | 11/2014 | Herbig | G06T 7/73 704/201 |
| 2015/0009050 A1* | 1/2015 | Lahr | H03M 5/12 341/70 |
| 2015/0121347 A1* | 4/2015 | Petit | G06F 17/5009 717/126 |
| 2016/0255444 A1* | 9/2016 | Bange | H04R 25/407 381/313 |

OTHER PUBLICATIONS

Xin Zhang et al., *Design of Small MEMS Microphone Array Systems for Direction Finding of Outdoors Moving Vehicles*, Sensors 2014, 14, 4384-4398; doi: 10.3390/s140304384, www.mdpi.com/journal/sensors, 15 pages.

\* cited by examiner

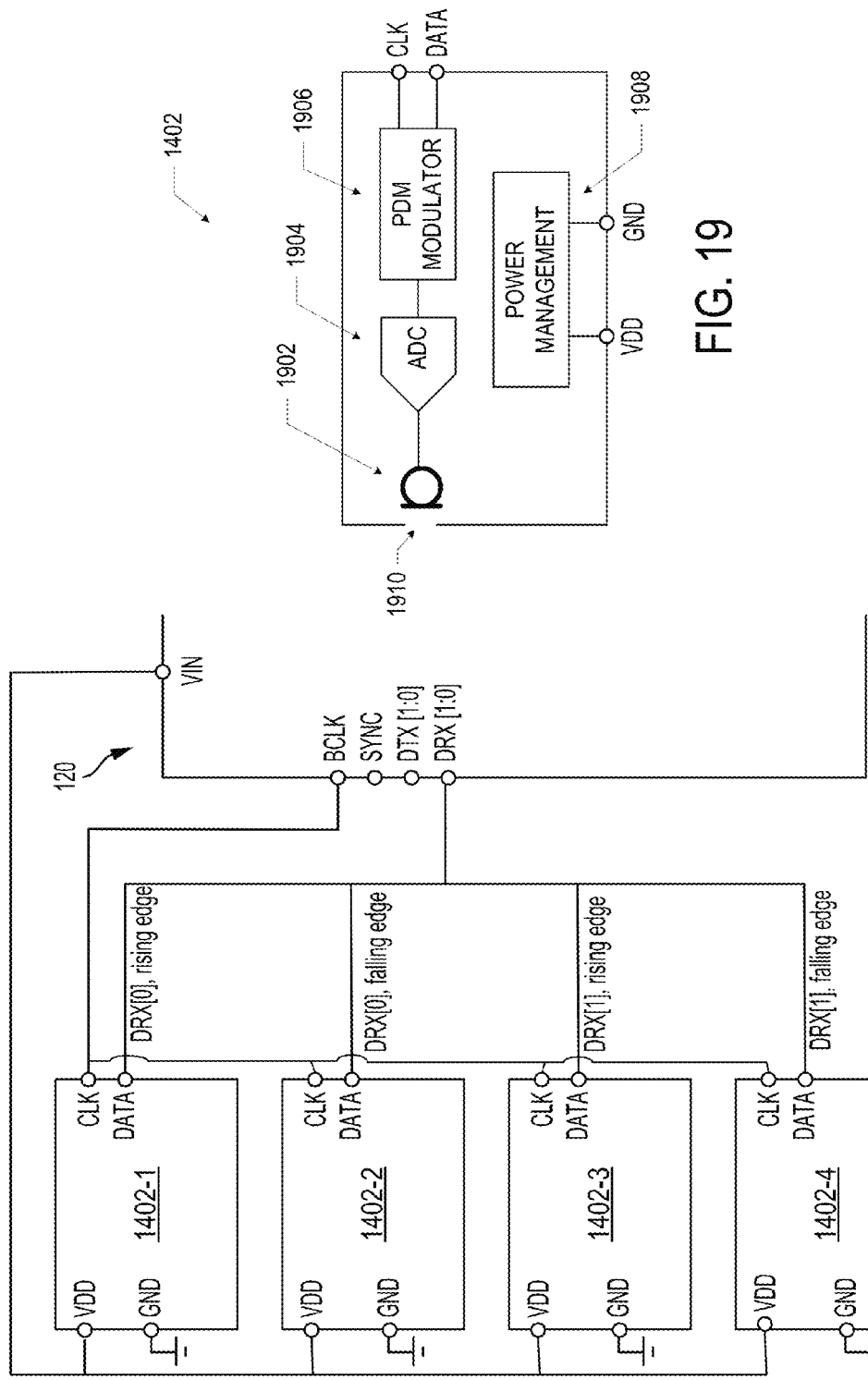

MICROPHONE ARRAYS AND COMMUNICATION SYSTEMS FOR DIRECTIONAL RECEPTION

BACKGROUND

In a beamforming microphone array, multiple microphones may be arranged (and their detected acoustic signals processed) so as to be more sensitive to sounds coming from one direction than another. For example, two (or more) microphones may be arranged in a line perpendicular to the direction from which sounds are arriving (in a "broadside array") or so that the microphones are in line with an acoustic source (in an end-fire array).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 18 is a schematic illustration of connections between the microphones of a four-microphone array and the node transceiver of FIG. 2, in accordance with various embodiments.

FIG. 19 is a block diagram of a microphone that may be included in any of the four-microphone arrays disclosed herein, in accordance with various embodiments.

DETAILED DESCRIPTION

Disclosed herein are embodiments of four-microphone arrays that may be flexibly utilized to achieve directional reception in many different directions. These arrays may enable directional reception for many locations of interest without the large number of microphones required by a more conventional approach. The description below begins with a discussion of an example communication system in which these microphone arrays may be used, then discusses the microphone arrays (and related devices and methods) in detail.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Various components may be referred to or illustrated herein in the singular (e.g., a "processor," a "peripheral device," etc.), but this is simply for ease of discussion, and any element referred to in the singular may include multiple such elements in accordance with the teachings herein.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. As used herein, the term "circuitry" may refer to, be part of, or include an application-specific integrated circuit (ASIC), an electronic circuit, and optical circuit, a processor (shared, dedicated, or group), and/or memory (shared, dedicated, or group) that execute one or more software or firmware programs, a combinational logic circuit, and/or other suitable hardware that provide the described functionality. A master node may also be referred to as a master "device" herein; similarly, a slave node may be referred to as a slave "device" herein.

Figure 1:
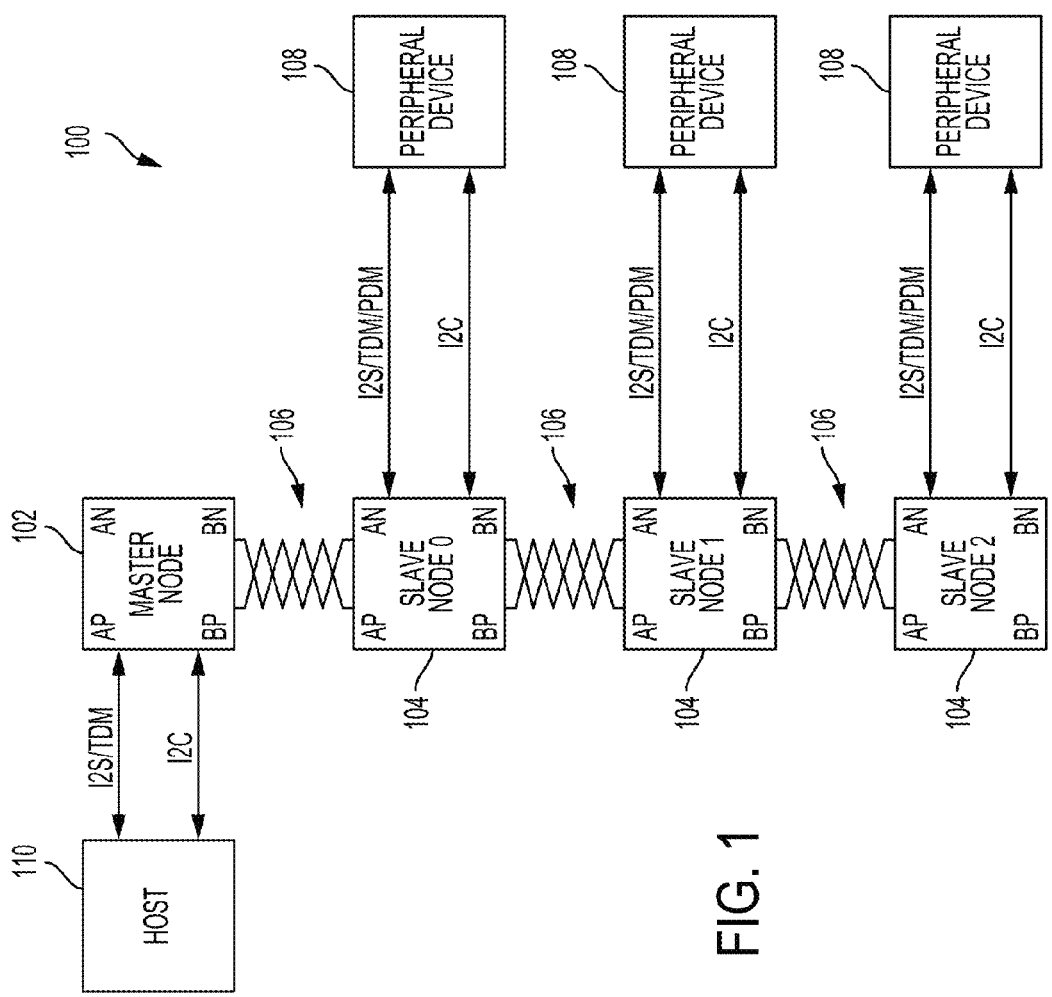
FIG. 1 is a block diagram of an illustrative two-wire communication system, in accordance with various embodiments.

The master node 102 may communicate with the slave nodes 104 over a two-wire bus 106. The bus 106 may include different two-wire bus links between adjacent nodes along the bus 106 to connect the nodes along the bus 106 in a daisy-chain fashion. For example, as illustrated in FIG. 1, the bus 106 may include a link coupling the master node 102 to the slave node 0, a link coupling the slave node 0 to the slave node 1, and a link coupling the slave node 1 to the slave node 2. In some embodiments, the links of the bus 106 may each be formed of a single twisted wire pair (e.g., an unshielded twisted pair). In some embodiments, the links of the bus 106 may each be formed of a coax cable (e.g., with the core providing the "positive" line and the shield providing the "negative" line, or vice versa).

The host 110 may include a processor that programs the master node 102, and acts as the originator and recipient of various payloads transmitted along the bus 106. In particular, the host 110 may be the master of Inter-Integrated Circuit Sound (I2S) communications that happen along the bus 106. The host 110 may communicate with the master node 102 via an I2S/Time Division Multiplex (TDM) bus and/or an Inter-Integrated Circuit (I2C) bus. In some embodiments, the master node 102 may be a transceiver (e.g., the node transceiver 120 discussed below with reference to FIG. 2) located within a housing of the host 110. The master node 102 may be programmable by the host 110 over the I2C bus for configuration and read-back, and may be configured to generate clock, synchronization, and framing for all of the slave nodes 104. In some embodiments, an extension of the I2C control bus between the host 110 in the master node 102 may be embedded in the data streams transmitted over the bus 106, allowing the host 110 direct access to registers and status information for the one or more slave nodes 104, as well as enabling I2C-to-I2C communication over distance to allow the host 110 to control the peripherals 108.

The master node 102 may generate "downstream" signals (e.g., data signals, power signals, etc., transmitted away from the master node 102 along the bus 106) and receive "upstream" signals (e.g., transmitted toward the master node 102 along the bus 106). The master node 102 may provide a clock signal for synchronous data transmission over the bus 106. As used herein, "synchronous data" may include data streamed continuously (e.g., audio signals) with a fixed time interval between two successive transmissions to/from the same node along the bus 106. In some embodiments, the clock signal provided by the master node 102 may be derived from an I2S input provided to the master node 102 by the host 110. A slave node 104 may be an addressable network connection point that represents a possible destination for data frames transmitted downstream on the bus 106 or upstream on the bus 106. A slave node 104 may also represent a possible source of downstream or upstream data frames. The system 100 may allow for control information and other data to be transmitted in both directions over the bus 106 from one node to the next. One or more of the slave nodes 104 may also be powered by signals transmitted over the bus 106.

In particular, each of the master node 102 and the slave nodes 104 may include a positive upstream terminal (denoted as "AP"), a negative upstream terminal (denoted as "AN"), a positive downstream terminal (denoted as "BP"), and a negative downstream terminal (denoted as "BN"). The positive and negative downstream terminals of a node may be coupled to the positive and negative upstream terminals of the adjacent downstream node, respectively. As shown in FIG. 1, the master node 102 may include positive and negative upstream terminals, but these terminals may not be used; in other embodiments, the master node 102 may not include positive and negative upstream terminals. The last slave node 104 along the bus 106 (the slave node 2 in FIG. 1) may include positive and negative downstream terminals, but these terminals may not be used; in other embodiments, the last slave node 104 along the bus may not include positive and negative downstream terminals.

As discussed in detail below, the master node 102 may periodically send a synchronization control frame downstream, optionally along with data intended for one or more of the slave nodes 104. For example, the master node 102 may transmit a synchronization control frame every 1024 bits (representing a superframe) at a frequency of 48 kHz, resulting in an effective bit rate on the bus 106 of 49.152 Mbps. Other rates may be supported, including, for example, 44.1 kHz. The synchronization control frame may allow the slave nodes 104 to identify the beginning of each superframe and also, in combination with physical layer encoding/signaling, may allow each slave node 104 to derive its internal operational clock from the bus 106. The synchronization control frame may include a preamble for signaling the start of synchronization, as well as control fields that allow for various addressing modes (e.g., normal, broadcast, discovery), configuration information (e.g., writing to registers of the slave nodes 104), conveyance of I2C information, remote control of certain general-purpose input/output (GPIO) pins at the slave nodes 104, and other services. A portion of the synchronization control frame following the preamble and the payload data may be scrambled in order to reduce the likelihood that information in the synchronization control frame will be mistaken for a new preamble, and to flatten the spectrum of related electromagnetic emissions.

The synchronization control frame may get passed between slave node 104 (optionally along with other data, which may come from the master node 102 but additionally or alternatively may come from one or more upstream slave nodes 104 or from a slave node 104 itself) until it reaches the last slave node 104 (i.e., the slave node 2 in FIG. 1), which has been configured by the master node 102 as the last slave node 104 or has self-identified itself as the last slave node 104. Upon receiving the synchronization control frame, the last slave node 104 may transmit a synchronization response frame followed by any data that it is permitted to transmit (e.g., a 24-bit audio sample in a designated time slot). The synchronization response frame may be passed upstream between slave nodes 104 (optionally along with data from downstream slave nodes 104), and based on the synchronization response frame, each slave node 104 may be able to identify a time slot, if any, in which the slave node 104 is permitted to transmit.

In some embodiments, one or more of the slave nodes 104 in the system 100 may be coupled to and communicate with a peripheral device 108. For example, a slave node 104 may be configured to read data from and/or write data to the associated peripheral device 108 using I2S, pulse density modulation (PDM), TDM, and/or I2C protocols, as discussed below. Although the "peripheral device 108" may be referred to in the singular herein, this is simply for ease of discussion, and a single slave node 104 may be coupled with zero, one, or more peripheral devices. Examples of peripheral devices that may be included in the peripheral device 108 may include a digital signal processor (DSP), a field programmable gate array (FPGA), an application-specific integrated circuit (ASIC), an analog to digital converter (ADC), a digital to analog converter (DAC), a codec, a microphone, a microphone array, a speaker, an audio amplifier, a protocol analyzer, an accelerometer or other motion sensor, an environmental condition sensor (e.g., a temperature, humidity, and/or gas sensor), a wired or wireless communication transceiver, a display device (e.g., a touchscreen display), a user interface component (e.g., a button, a dial, or other control), a camera (e.g., a video camera), a memory device, or any other suitable device that transmits and/or receives data. A number of examples of different peripheral device configurations are discussed in detail herein.

In some embodiments, the peripheral device 108 may include any device configured for Inter-Integrated Circuit Sound (I2S) communication; the peripheral device 108 may communicate with the associated slave node 104 via the I2S protocol. In some embodiments, the peripheral device 108 may include any device configured for Inter-Integrated Circuit (I2C) communication; the peripheral device 108 may communicate with the associated slave node 104 via the I2C protocol. In some embodiments, a slave node 104 may not be coupled to any peripheral device 108.

A slave node 104 and its associated peripheral device 108 may be contained in separate housings and coupled through a wired or wireless communication connection or may be contained in a common housing. For example, a speaker connected as a peripheral device 108 may be packaged with the hardware for an associated slave node 104 (e.g., the node transceiver 120 discussed below with reference to FIG. 2), such that the hardware for the associated slave node 104 is contained within a housing that includes other speaker components. The same may be true for any type of peripheral device 108.

As discussed above, the host 110 may communicate with and control the master node 102 using multi-channel I2S and I2C communication protocols. In particular, the host 110 may transmit data via I2S to a frame buffer (not illustrated) in the master node 102, and the master node 102 may read data from the frame buffer and transmit the data along the bus 106. Analogously, the master node 102 may store data received via the bus 106 in the frame buffer, and then may transmit the data to the host 110 via I2S.

Each slave node 104 may have internal control registers that may be configured by communications from the master node 102. A number of such registers are discussed in detail below. Each slave node 104 may receive downstream data and may retransmit the data further downstream. Each slave node 104 may receive and/or generate upstream data and/or retransmit data upstream and/or add data to and upstream transaction.

Communications along the bus 106 may occur in periodic superframes. Each superframe may begin with a downstream synchronization control frame; be divided into periods of downstream transmission (also called "downstream portions"), upstream transmission (also called "upstream portions"), and no transmission (where the bus 106 is not driven); and end just prior to transmission of another downstream synchronization control frame. The master node 102 may be programmed (by the host 110) with a number of downstream portions to transmit to one or more of the slave nodes 104 and a number of upstream portions to receive from one or more of the slave nodes 104. Each slave node 104 may be programmed (by the master node 102) with a number of downstream portions to retransmit down the bus 106, a number of downstream portions to consume, a number of upstream portions to retransmit up the bus 106, and a number of upstream portions in which the slave node 104 may transmit data received from the slave node 104 from the associated peripheral device 108. Communication along the bus 106 is discussed in further detail below with reference to FIGS. 2-12.

Figure 2:
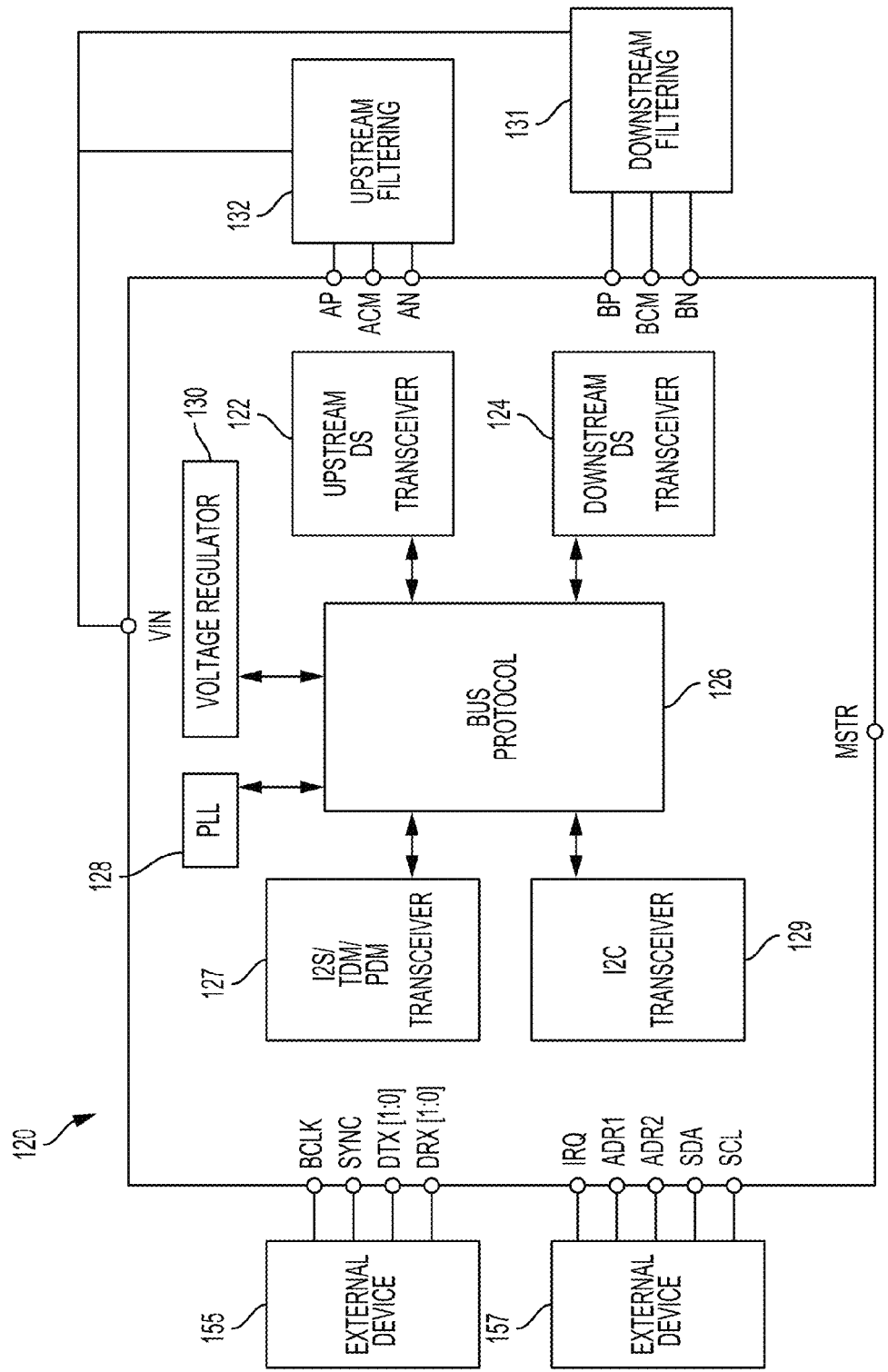
FIG. 2 is a block diagram of a node transceiver that may be included in a node of the system of FIG. 1, in accordance with various embodiments.

Each of the master node 102 and the slave nodes 104 may include a transceiver to manage communication between components of the system 100. FIG. 2 is a block diagram of a node transceiver 120 that may be included in a node (e.g., the master node 102 or a slave node 104) of the system 100 of FIG. 1, in accordance with various embodiments. In some embodiments, a node transceiver 120 may be included in each of the nodes of the system 100, and a control signal may be provided to the node transceiver 120 via a master (MSTR) pin to indicate whether the node transceiver 120 is to act as a master (e.g., when the MSTR pin is high) or a slave (e.g., when the MSTR pin is low).

The node transceiver 120 may include an upstream differential signaling (DS) transceiver 122 and a downstream DS transceiver 124. The upstream DS transceiver 122 may be coupled to the positive and negative upstream terminals discussed above with reference to FIG. 1, and the downstream DS transceiver 124 may be coupled to the positive and negative downstream terminals discussed above with reference to FIG. 1. In some embodiments, the upstream DS transceiver 122 may be a low voltage DS (LVDS) transceiver, and the downstream DS transceiver 124 may be an LVDS transceiver. Each node in the system 100 may be AC-coupled to the bus 106, and data signals may be conveyed along the bus 106 (e.g., via the upstream DS transceiver 122 and/or the downstream DS transceiver 124) using a predetermined form of DS (e.g., LVDS or Multipoint LVDS (MLVDS) or similar signaling) with appropriate encoding to provide timing information over the bus 106 (e.g., differential Manchester coding, biphase mark coding, Manchester coding, Non-Return-to-Zero, Inverted (NRZI) coding with run-length limiting, or any other suitable encoding).

The upstream DS transceiver 122 and the downstream DS transceiver 124 may communicate with bus protocol circuitry 126, and the bus protocol circuitry 126 may communicate with a phased locked loop (PLL) 128 and voltage regulator circuitry 130, among other components. When the node transceiver 120 is powered up, the voltage regulator circuitry 130 may raise a "power good" signal that is used by the PLL 128 as a power-on reset.

As noted above, one or more of the slave nodes 104 in the system 100 may receive power transmitted over the bus 106 concurrently with data. For power distribution (which is optional, as some of the slave nodes 104 may be configured to have exclusively local power provided to them), the master node 102 may place a DC bias on the bus link between the master node 102 and the slave node 0 (e.g., by connecting one of the downstream terminals to a voltage source provided by a voltage regulator and the other downstream terminal to ground). The DC bias may be a predetermined voltage, such as 5 V, 8 V, the voltage of a car battery, or a higher voltage. Each successive slave node 104 can selectively tap its upstream bus link to recover power (e.g., using the voltage regulator circuitry 130). This power may be used to power the slave node 104 itself (and optionally one or more peripheral device 108 coupled to the slave node 104). A slave node 104 may also selectively bias the bus link downstream for the next-in-line slave node 104 with either the recovered power from the upstream bus link or from a local power supply. For example, the slave node 0 may use the DC bias on the upstream bus link 106 to recover power for the slave node 0 itself and/or for one or more associated peripheral device 108, and/or the slave node 0 may recover power from its upstream bus link 106 to bias its downstream bus link 106.

Thus, in some embodiments, each node in the system 100 may provide power to the following downstream node over a downstream bus link. The powering of nodes may be performed in a sequenced manner. For example, after discovering and configuring the slave node 0 via the bus 106, the master node 102 may instruct the slave node 0 to provide power to its downstream bus link 106 in order to provide power to the slave node 1; after the slave node 1 is discovered and configured, the master node 102 may instruct the slave node 1 to provide power to its downstream bus link 106 in order to provide power to the slave node 2 (and so on for additional slave nodes 104 coupled to the bus 106. In some embodiments, one or more of the slave nodes 104 may be locally powered, instead of or in addition to being powered from its upstream bus link. In some such embodiments, the local power source for a given slave node 104 may be used to provide power to one or more downstream slave nodes.

In some embodiments, upstream filtering circuitry 132 may be disposed between the upstream DS transceiver 122 and the voltage regulator circuitry 130, and downstream filtering circuitry 131 may be disposed between the downstream DS transceiver 124 and the voltage regulator circuitry 130. Since each link of the bus 106 may carry AC (signal) and DC (power) components, the upstream filtering circuitry 132 and the downstream filtering circuitry 131 may separate the AC and DC components, providing the AC components to the upstream DS transceiver 122 and the downstream DS transceiver 124, and providing the DC components to the voltage regulator 130. AC couplings on the line side of the upstream DS transceiver 122 and downstream DS transceiver 124 substantially isolate the transceivers 122 and 124 from the DC component on the line to allow for high-speed bi-directional communications. As discussed above, the DC component may be tapped for power, and the upstream filtering circuitry 132 and the downstream filtering circuitry 131 may include a ferrite, a common mode choke, or an inductor, for example, to reduce the AC component provided to the voltage regulator circuitry 130. In some embodiments, the upstream filtering circuitry 132 may be included in the upstream DS transceiver 122, and/or the downstream filtering circuitry 131 may be included in the downstream DS transceiver 124; in other embodiments, the filtering circuitry may be external to the transceivers 122 and 124.

The node transceiver 120 may include a transceiver 127 for I2S, TDM, and PDM communication between the node transceiver 120 and an external device 155. Although the "external device 155" may be referred to in the singular herein, this is simply for ease of illustration, and multiple external devices may communicate with the node transceiver 120 via the I2S/TDM/PDM transceiver 127. As known in the art, the I2S protocol is for carrying pulse code modulated (PCM) information (e.g., between audio chips on a printed circuit board (PCB)). As used herein, "I2S/TDM" may refer to an extension of the I2S stereo (2-channel) content to multiple channels using TDM. As known in the art, PDM may be used in sigma delta converters, and in particular, PDM format may represent an over-sampled 1-bit sigma delta ADC signal before decimation. PDM format is often used as the output format for digital microphones. The I2S/TDM/PDM transceiver 127 may be in communication with the bus protocol circuitry 126 and pins for communication with the external device 155. Six pins, BCLK, SYNC, DTX[1:0], and DRX[1:0], are illustrated in FIG. 2; the BCLK pin may be used for an I2S bit clock, the SYNC pin may be used for an I2S frame synchronization signal, and the DTX[1:0] and DRX[1:0] pins are used for transmit and receive data channels, respectively. Although two transmit pins (DTX[1:0]) and two receive pins (DRX[1:0]) are illustrated in FIG. 2, any desired number of receive and/or transmit pins may be used.

When the node transceiver 120 is included in the master node 102, the external device 155 may include the host 110, and the I2S/TDM/PDM transceiver 127 may provide an I2S slave (in regards to BCLK and SYNC) that can receive data from the host 110 and send data to the host 110 synchronously with an I2S interface clock of the host 110. In particular, an I2S frame synchronization signal may be received at the SYNC pin as an input from the host 110, and the PLL 128 may use that signal to generate clocks. When the node transceiver 120 is included in a slave node 104, the external device 155 may include one or more peripheral devices 108, and the I2S/TDM/PDM transceiver 127 may provide an I2S clock master (for BCLK and SYNC) that can control I2S communication with the peripheral device 108. In particular, the I2S/TDM/PDM transceiver 127 may provide an I2S frame synchronization signal at the SYNC pin as an output. Registers in the node transceiver 120 may determine which and how many I2S/TDM channels are being transmitted as data slots over the bus 106. A TDM mode (TDMMODE) register in the node transceiver 120 may store a value of how many TDM channels fit between consecutive SYNC pulses on a TDM transmit or receive pin. Together with knowledge of the channel size, the node transceiver 120 may automatically set the BCLK rate to match the amount of bits within the sampling time (e.g., 48 kHz).

The node transceiver 120 may include a transceiver 129 for I2C communication between the node transceiver 120 and an external device 157. Although the "external device 157" may be referred to in the singular herein, this is simply for ease of illustration, and multiple external devices may communicate with the node transceiver 120 via the I2C transceiver 129. As known in the art, the I2C protocol uses clock (SCL) and data (SDA) lines to provide data transfer. The I2C transceiver 129 may be in communication with the bus protocol circuitry 126 and pins for communication with the external device 157. Four pins, ADR1, ADR2, SDA, and SCL are illustrated in FIG. 2; ADR1 and ADR2 may be used to modify the I2C addresses used by the node transceiver 120 when the node transceiver 120 acts as an I2C slave (e.g., when it is included in the master node 102), and SDA and SCL are used for the I2C serial data and serial clock signals, respectively. When the node transceiver 120 is included in the master node 102, the external device 157 may include the host 110, and the I2C transceiver 129 may provide an I2C slave that can receive programming instructions from the host 110. In particular, an I2C serial clock signal may be received at the SCL pin as an input from the host 110 for register accesses. When the node transceiver 120 is included in a slave node 104, the external device 157 may include a peripheral device 108 and the I2C transceiver 129 may provide an I2C master to allow the I2C transceiver to program one or more peripheral devices in accordance with instructions provided by the host 110 and transmitted to the node transceiver 120 via the bus 106. In particular, the I2C transceiver 129 may provide the I2C serial clock signal at the SCL pin as an output.

The node transceiver 120 may include an interrupt request (IRQ) pin in communication with the bus protocol circuitry 126. When the node transceiver 120 is included in the master node 102 via the I2C transceiver 129, the bus protocol circuitry 126 may provide event-driven interrupt requests toward the host 110 via the IRQ pin. When the node transceiver 120 is included in a slave node 104 (e.g., when the MSTR pin is low), the IRQ pin may serve as a GPIO pin with interrupt request capability.

The system 100 may operate in any of a number of different operational modes. The nodes on the bus 106 may each have a register indicating which operational mode is currently enabled. Descriptions follow of examples of various operational modes that may be implemented. In a standby operational mode, bus activity is reduced to enable global power savings; the only traffic required is a minimal downstream preamble to keep the PLLs of each node (e.g., the PLL 128) synchronized. In standby operational mode, reads and writes across the bus 106 are not supported. In a discovery operational mode, the master node 102 may send predetermined signals out along the bus 106 and wait for suitable responses to map out the topology of slave nodes 104 distributed along the bus 106. In a normal operational mode, full register access may be available to and from the slave nodes 104 as well as access to and from peripheral devices 108 over the bus 106. Normal mode may be globally configured by the host 110 with or without synchronous upstream data and with or without synchronous downstream data.

Figure 3:
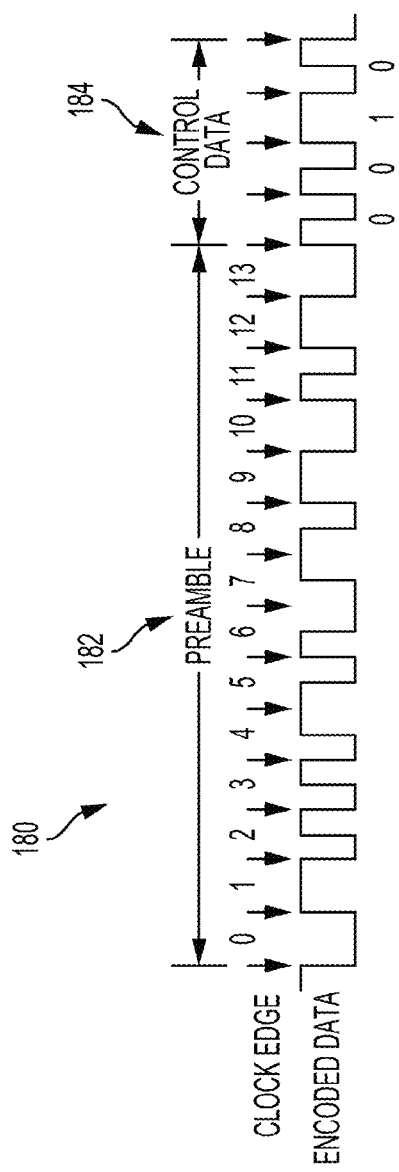
FIG. 3 is a diagram of a portion of a synchronization control frame used for communication in the system of FIG. 1, in accordance with various embodiments.

FIG. 3 is a diagram of a portion of a synchronization control frame 180 used for communication in the system 100, in accordance with various embodiments. In particular, the synchronization control frame 180 may be used for data clock recovery and PLL synchronization, as discussed below. As noted above, because communications over the bus 106 may occur in both directions, communications may be time-multiplexed into downstream portions and upstream portions. In a downstream portion, a synchronization control frame and downstream data may be transmitted from the master node 102, while in an upstream portion, a synchronization response frame, and upstream data may be transmitted to the master node 102 from each of the slave nodes 104. The synchronization control frame 180 may include a preamble 182 and control data 184. Each slave node 104 may be configured to use the preamble 182 of the received synchronization control frame 180 as a time base for feeding the PLL 128. To facilitate this, a preamble 182 does not follow the "rules" of valid control data 184, and thus can be readily distinguished from the control data 184.

Figure 5:
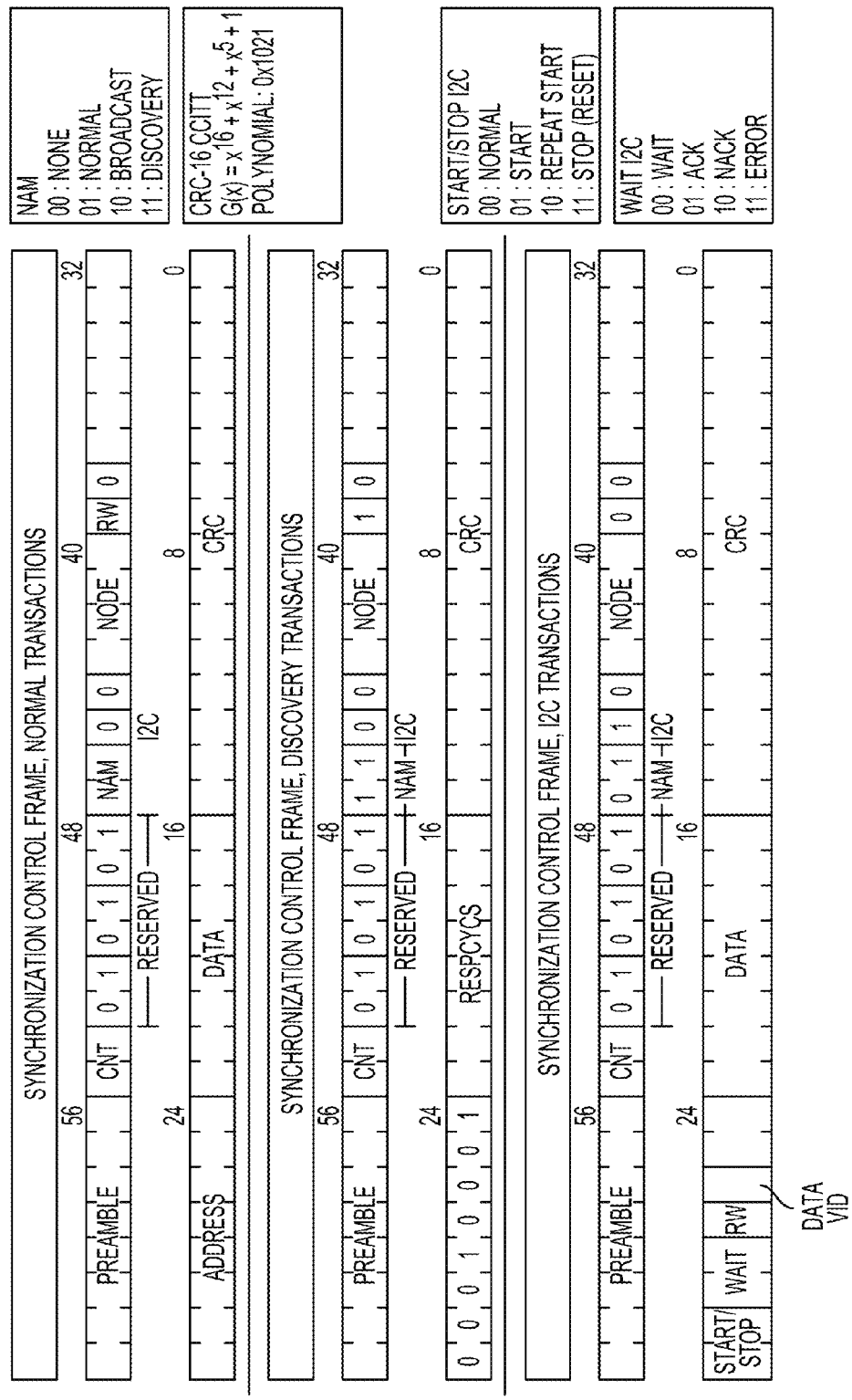
FIG. 5 illustrates example formats for a synchronization control frame in different modes of operation of the system of FIG. 1, in accordance with various embodiments.

For example, in some embodiments, communication along the bus 106 may be encoded using a clock first, transition on zero differential Manchester coding scheme. According to such an encoding scheme, each bit time begins with a clock transition. If the data value is zero, the encoded signal transitions again in the middle of the bit time. If the data value is one, the encoded signal does not transition again. The preamble 182 illustrated in FIG. 5 may violate the encoding protocol (e.g., by having clock transitions that do not occur at the beginning of bit times 5, 7, and 8), which means that the preamble 182 may not match any legal (e.g., correctly encoded) pattern for the control data 184. In addition, the preamble 182 cannot be reproduced by taking a legal pattern for the control data 184 and forcing the bus 106 high or low for a single bit time or for a multiple bit time period. The preamble 182 illustrated in FIG. 5 is simply illustrative, and the synchronization control frame 180 may include different preambles 182 that may violate the encoding used by the control data 184 in any suitable manner.

The bus protocol circuitry 126 may include differential Manchester decoder circuitry that runs on a clock recovered from the bus 106 and that detects the synchronization control frame 180 to send a frame sync indicator to the PLL 128. In this manner, the synchronization control frame 180 may be detected without using a system clock or a higher-speed oversampling clock. Consequently, the slave nodes 104 can receive a PLL synchronization signal from the bus 106 without requiring a crystal clock source at the slave nodes 104.

Figure 4:
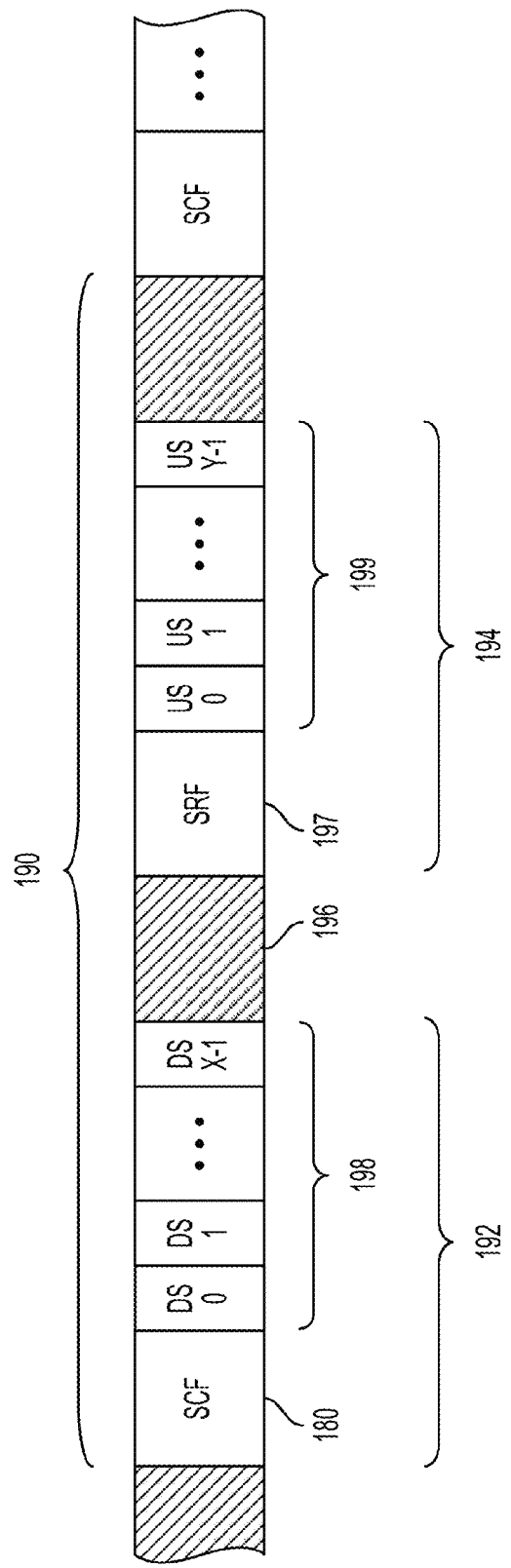
FIG. 4 is a diagram of a superframe used for communication in the system of FIG. 1, in accordance with various embodiments.
Figure 6:
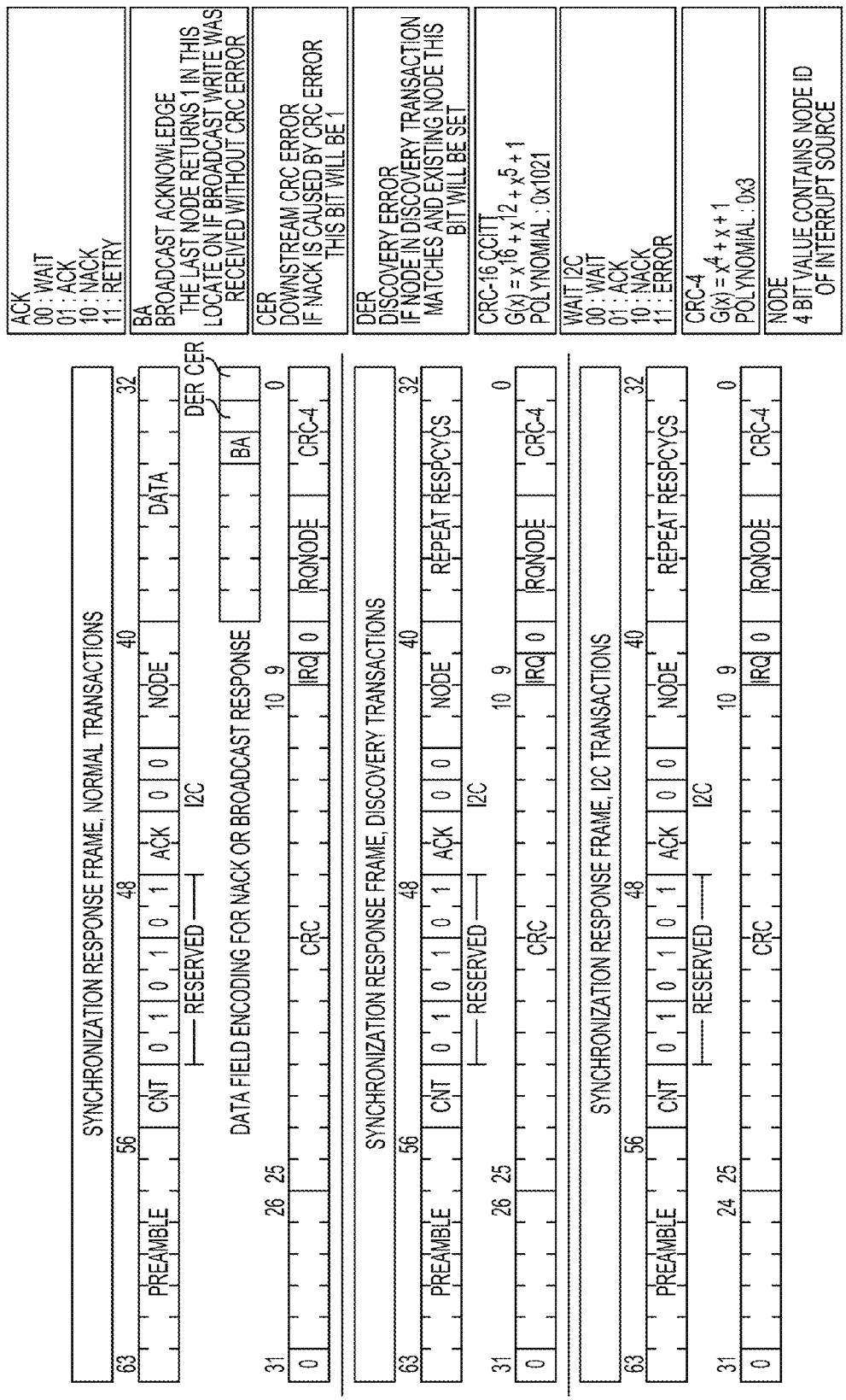
FIG. 6 illustrates example formats for a synchronization response frame at different modes of operation of the system of FIG. 1, in accordance with various embodiments.

As noted above, communications along the bus 106 may occur in periodic superframes. FIG. 4 is a diagram of a superframe 190, in accordance with various embodiments. As shown in FIG. 6, a superframe may begin with a synchronization control frame 180. When the synchronization control frame 180 is used as a timing source for the PLL 128, the frequency at which superframes are communicated ("the superframe frequency") may be the same as the synchronization signal frequency. In some embodiments in which audio data is transmitted along the bus 106, the superframe frequency may be the same as the audio sampling frequency used in the system 100 (e.g., either 48 kHz or 44.1 kHz), but any suitable superframe frequency may be used. Each superframe 190 may be divided into periods of downstream transmission 192, periods of upstream transmission 194, and periods of no transmission 196 (e.g., when the bus 106 is not driven).

In FIG. 4, the superframe 190 is shown with an initial period of downstream transmission 192 and a later period of upstream transmission 194. The period of downstream transmission 192 may include a synchronization control frame 180 and X downstream data slots 198, where X can be zero. Substantially all signals on the bus 106 may be line-coded and a synchronization signal forwarded downstream from the master node 102 to the last slave node 104 (e.g., the slave node 104C) in the form of the synchronization preamble 182 in the synchronization control frame 180, as discussed above. Downstream, TDM, synchronous data may be included in the X downstream data slots 198 after the synchronization control frame 180. The downstream data slots 198 may have equal width. As discussed above, the PLL 128 may provide the clock that a node uses to time communications over the bus 106. In some embodiments in which the bus 106 is used to transmit audio data, the PLL 128 may operate at a multiple of the audio sampling frequency (e.g., 1024 times the audio sampling frequency, resulting in 1024-bit clocks in each superframe).

The period of upstream transmission 194 may include a synchronization response frame 197 and Y upstream data slots 199, where Y can be zero. In some embodiments, each slave node 104 may consume a portion of the downstream data slots 198. The last slave node (e.g., slave node 2 in FIG. 1) may respond (after a predetermined response time stored in a register of the last slave node) with a synchronization response frame 197. Upstream, TDM, synchronous data may be added by each slave node 104 in the upstream data slots 199 directly after the synchronization response frame 197. The upstream data slots 199 may have equal width. A slave node 104 that is not the last slave node (e.g., the slave nodes 0 and 1 in FIG. 1) may replace the received synchronization response frame 197 with its own upstream response if a read of one of its registers was requested in the synchronization control frame 180 of the superframe 190 or if a remote I2C read was requested in the synchronization control frame 180 of the superframe 190.

As discussed above, the synchronization control frame 180 may begin each downstream transmission. In some embodiments, the synchronization control frame 180 may be 64 bits in length, but any other suitable length may be used. The synchronization control frame 180 may begin with the preamble 182, as noted above. In some embodiments, when the synchronization control frame 180 is retransmitted by a slave node 104 to a downstream slave node 104, the preamble 182 may be generated by the transmitting slave node 104, rather than being retransmitted.

The control data 184 of the synchronization control frame 180 may include fields that contain data used to control transactions over the bus 106. Examples of these fields are discussed below, and some embodiments are illustrated in FIG. 5. In particular, FIG. 5 illustrates example formats for the synchronization control frame 180 in normal mode, I2C mode, and discovery mode, in accordance with various embodiments. In some embodiments, a different preamble 182 or synchronization control frame 180 entirely may be used in standby mode so that the slave nodes 104 do not need to receive all of the synchronization control frame 180 until a transition to normal mode is sent.

In some embodiments, the synchronization control frame 180 may include a count (CNT) field. The CNT field may have any suitable length (e.g., 2 bits) and may be incremented (modulo the length of the field) from the value used in the previous superframe. A slave node 104 that receives a CNT value that is unexpected may be programmed to return an interrupt.

In some embodiments, the synchronization control frame 180 may include a node addressing mode (NAM) field. The NAM field may have any suitable length (e.g., 2 bits) and may be used to control access to registers of a slave node 104 over the bus 106. In normal mode, registers of a slave node 104 may be read from and/or written to based on the ID of the slave node 104 and the address of the register. Broadcast transactions are writes which should be taken by every slave node 104. In some embodiments, the NAM field may provide for four node addressing modes, including "none" (e.g., data not addressed to any particular slave node 104), "normal" (e.g., data unicast to a specific slave node 104 specified in the address field discussed below), "broadcast" (e.g., addressed to all slave nodes 104), and "discovery."

In some embodiments, the synchronization control frame 180 may include an I2C field. The I2C field may have any suitable length (e.g., 1 bit) and may be used to indicate that the period of downstream transmission 192 includes an I2C transaction. The I2C field may indicate that the host 110 has provided instructions to remotely access a peripheral device 108 that acts as an I2C slave with respect to an associated slave node 104.

In some embodiments, the synchronization control frame 180 may include a node field. The node field may have any suitable length (e.g., 4 bits) and may be used to indicate which slave node is being addressed for normal and I2C accesses. In discovery mode, this field may be used to program an identifier for a newly discovered slave node 104 in a node ID register of the slave node 104. Each slave node 104 in the system 100 may be assigned a unique ID when the slave node 104 is discovered by the master node 102, as discussed below. In some embodiments, the master node 102 does not have a node ID, while in other embodiments, the master node 102 may have a node ID. In some embodiments, the slave node 104 attached to the master node 102 on the bus 106 (e.g., the slave node 0 in FIG. 1) will be slave node 0, and each successive slave node 104 will have a number that is 1 higher than the previous slave node. However, this is simply illustrative, and any suitable slave node identification system may be used.

In some embodiments, the synchronization control frame 180 may include a read/write (RW) field. The RW field may have any suitable length (e.g., 1 bit) and may be used to control whether normal accesses are reads (e.g., RW==1) or writes (e.g., RW==0).

In some embodiments, the synchronization control frame 180 may include an address field. The address field may have any suitable length (e.g., 8 bits) and may be used to address specific registers of a slave node 104 through the bus 106. For I2C transactions, the address field may be replaced with I2C control values, such as START/STOP, WAIT, RW, and DATA VLD. For discovery transactions, the address field may have a predetermined value (e.g., as illustrated in FIG. 5).

In some embodiments, the synchronization control frame 180 may include a data field. The data field may have any suitable length (e.g., 8 bits) and may be used for normal, I2C, and broadcast writes. The RESPCYCS value, multiplied by 4, may be used to determine how many cycles a newly discovered node should allow to elapse between the start of the synchronization control frame 180 being received and the start of the synchronization response frame 197 being transmitted. When the NAM field indicates discovery mode, the node address and data fields discussed below may be encoded as a RESPCYCS value that, when multiplied by a suitable optional multiplier (e.g., 4), indicates the time, in bits, from the end of the synchronization control frame 180 to the start of the synchronization response frame 197. This allows a newly discovered slave node 104 to determine the appropriate time slot for upstream transmission.

In some embodiments, the synchronization control frame 180 may include a cyclic redundancy check (CRC) field. The CRC field may have any suitable length (e.g., 16 bits) and may be used to transmit a CRC value for the control data 184 of the synchronization control frame 180 following the preamble 182. In some embodiments, the CRC may be calculated in accordance with the CCITT-CRC error detection scheme.

In some embodiments, at least a portion of the synchronization control frame 180 between the preamble 182 and the CRC field may be scrambled in order to reduce the likelihood that a sequence of bits in this interval will periodically match the preamble 182 (and thus may be misinterpreted by the slave node 104 as the start of a new superframe 190), as well as to reduce electromagnetic emissions as noted above. In some such embodiments, the CNT field of the synchronization control frame 180 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 104 or to reduce the likelihood that the preamble 182 shows up elsewhere in the synchronization control frame 180, in addition to or in lieu of techniques such as scrambling and/or error encoding as discussed above. For example, a longer synchronization sequence may be used so as to reduce the likelihood that a particular encoding of the remainder of the synchronization control frame 180 will match it. Additionally or alternatively, the remainder of the synchronization control frame may be structured so that the synchronization sequence cannot occur, such as by placing fixed "0" or "1" values at appropriate bits.

The master node 102 may send read and write requests to the slave nodes 104, including both requests specific to communication on the bus 106 and I2C requests. For example, the master node 102 may send read and write requests (indicated using the RW field) to one or more designated slave nodes 104 (using the NAM and node fields) and can indicate whether the request is a request for the slave node 104 specific to the bus 106, an I2C request for the slave node 104, or an I2C request to be passed along to an I2C-compatible peripheral device 108 coupled to the slave node 104 at one or more I2C ports of the slave node 104.

Turning to upstream communication, the synchronization response frame 197 may begin each upstream transmission. In some embodiments, the synchronization response frame 197 may be 64 bits in length, but any other suitable length may be used. The synchronization response frame 197 may also include a preamble, as discussed above with reference to the preamble 182 of the synchronization control frame 180, followed by data portion. At the end of a downstream transmission, the last slave node 104 on the bus 106 may wait until the RESPCYCS counter has expired and then begin transmitting a synchronization response frame 197 upstream. If an upstream slave node 104 has been targeted by a normal read or write transaction, a slave node 104 may generate its own synchronization response frame 197 and replace the one received from downstream. If any slave node 104 does not see a synchronization response frame 197 from a downstream slave node 104 at the expected time, the slave node 104 will generate its own synchronization response frame 197 and begin transmitting it upstream.

The data portion of the synchronization response frame 197 may include fields that contain data used to communicate response information back to the master node 102. Examples of these fields are discussed below, and some embodiments are illustrated in FIG. 6. In particular, FIG. 6 illustrates example formats for the synchronization response frame 197 in normal mode, I2C mode, and discovery mode, in accordance with various embodiments.

In some embodiments, the synchronization response frame 197 may include a count (CNT) field. The CNT field may have any suitable length (e.g., 2 bits) and may be used to transmit the value of the CNT field in the previously received synchronization control frame 180.

In some embodiments, the synchronization response frame 197 may include an acknowledge (ACK) field. The ACK field may have any suitable length (e.g., 2 bits), and may be inserted by a slave node 104 to acknowledge a command received in the previous synchronization control frame 180 when that slave node 104 generates the synchronization response frame 197. Example indicators that may be communicated in the ACK field include wait, acknowledge, not acknowledge (NACK), and retry. In some embodiments, the ACK field may be sized to transmit an acknowledgment by a slave node 104 that it has received and processed a broadcast message (e.g., by transmitting a broadcast acknowledgment to the master node 102). In some such embodiments, a slave node 104 also may indicate whether the slave node 104 has data to transmit (which could be used, for example, for demand-based upstream transmissions, such as non-TDM inputs from a keypad or touchscreen, or for prioritized upstream transmission, such as when the slave node 104 wishes to report an error or emergency condition).

In some embodiments, the synchronization response frame 197 may include an I2C field. The I2C field may have any suitable length (e.g., 1 bit) and may be used to transmit the value of the I2C field in the previously received synchronization control frame 180.

In some embodiments, the synchronization response frame 197 may include a node field. The node field may have any suitable length (e.g., 4 bits) and may be used to transmit the ID of the slave node 104 that generates the synchronization response frame 197.

In some embodiments, the synchronization response frame 197 may include a data field. The data field may have any suitable length (e.g., 8 bits), and its value may depend on the type of transaction and the ACK response of the slave node 104 that generates the synchronization response frame 197. For discovery transactions, the data field may include the value of the RESPCYCS field in the previously received synchronization control frame 180. When the ACK field indicates a NACK, or when the synchronization response frame 197 is responding to a broadcast transaction, the data field may include a broadcast acknowledge (BA) indicator (in which the last slave node 104 may indicate if the broadcast write was received without error), a discovery error (DER) indicator (indicating whether a newly discovered slave node 104 in a discovery transaction matches an existing slave node 104), and a CRC error (CER) indicator (indicating whether a NACK was caused by a CRC error).

In some embodiments, the synchronization response frame 197 may include a CRC field. The CRC field may have any suitable length (e.g., 16 bits) and may be used to transmit a CRC value for the portion of the synchronization response frame 197 between the preamble and the CRC field.

In some embodiments, the synchronization response frame 197 may include an interrupt request (IRQ) field. The IRQ field may have any suitable length (e.g., 1 bit) and may be used to indicate that an interrupt has been signaled from a slave node 104.

In some embodiments, the synchronization response frame 197 may include an IRQ node (IRQNODE) field. The IRQNODE field may have any suitable length (e.g., 4 bits) and may be used to transmit the ID of the slave node 104 that has signaled the interrupt presented by the IRQ field. In some embodiments, the slave node 104 for generating the IRQ field will insert its own ID into the IRQNODE field.

In some embodiments, the synchronization response frame 197 may include a second CRC (CRC-4) field. The CRC-4 field may have any suitable length (e.g., 4 bits) and may be used to transmit a CRC value for the IRQ and IRQNODE fields.

In some embodiments, the synchronization response frame 197 may include an IRQ field, an IRQNODE field, and a CRC-4 field as the last bits of the synchronization response frame 197 (e.g., the last 10 bits). As discussed above, these interrupt-related fields may have their own CRC protection in the form of CRC-4 (and thus not protected by the preceding CRC field). Any slave node 104 that needs to signal an interrupt to the master node 102 will insert its interrupt information into these fields. In some embodiments, a slave node 104 with an interrupt pending may have higher priority than any slave node 104 further downstream that also has an interrupt pending. The last slave node 104 along the bus 106 (e.g., the slave node 2 in FIG. 1) may always populate these interrupt fields. If the last slave node 104 has no interrupt pending, the last slave node 104 may set the IRQ bit to 0, the IRQNODE field to its node ID, and provide the correct CRC-4 value. For convenience, a synchronization response frame 197 that conveys an interrupt may be referred to herein as an "interrupt frame."

In some embodiments, at least a portion of the synchronization response frame 197 between the preamble 182 and the CRC field may be scrambled in order to reduce emissions. In some such embodiments, the CNT field of the synchronization response frame 197 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 104 or to reduce the likelihood that the preamble 182 shows up elsewhere in the synchronization response frame 197, in addition to or in lieu of techniques such as scrambling and/or error encoding as discussed above. For example, a longer synchronization sequence may be used so as to reduce the likelihood that a particular encoding of the remainder of the synchronization response frame 180 will match it. Additionally or alternatively, the remainder of the synchronization response frame may be structured so that the synchronization sequence cannot occur, such as by placing fixed "0" or "1" values at appropriate bits.

Figure 7:
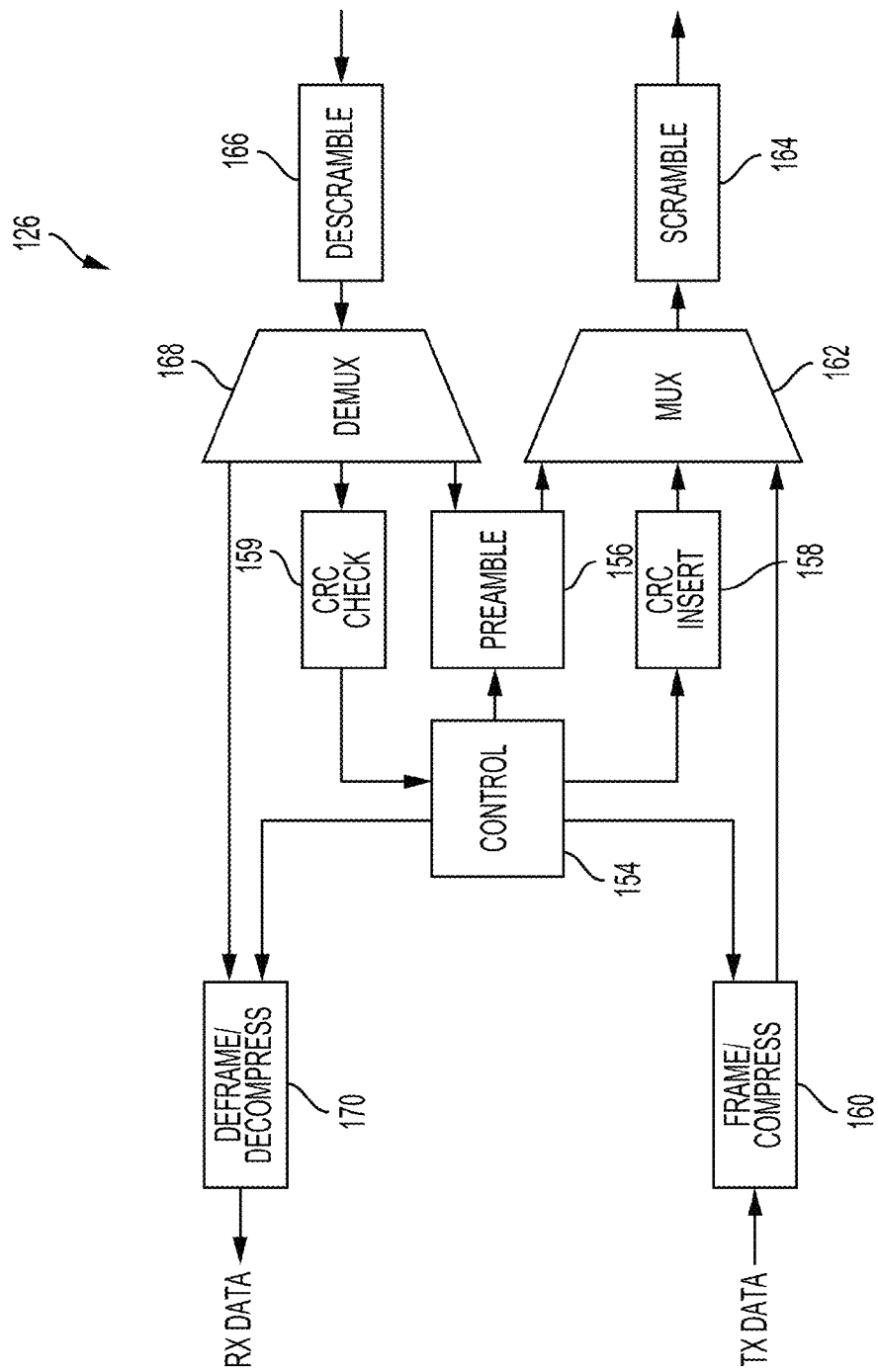
FIG. 7 is a block diagram of various components of the bus protocol circuitry of FIG. 2, in accordance with various embodiments.

FIG. 7 is a block diagram of the bus protocol circuitry 126 of FIG. 2, in accordance with various embodiments. The bus protocol circuitry 126 may include control circuitry 154 to control the operation of the node transceiver 120 in accordance with the protocol for the bus 106 described herein. In particular, the control circuitry 154 may control the generation of synchronization frames for transmission (e.g., synchronization control frames or synchronization response frames, as discussed above), the processing of received synchronization frames, and the performance of control operations specified in received synchronization control frames. The control circuitry 154 may include programmable registers, as discussed below. The control circuitry 154 may create and receive synchronization control frames, react appropriately to received messages (e.g., associated with a synchronization control frame when the bus protocol circuitry 126 is included in a slave node 104 or from an I2C device when the bus protocol circuitry 126 is included in a master node 102), and adjust the framing to the different operational modes (e.g., normal, discovery, standby, etc.).

When the node transceiver 120 is preparing data for transmission along the bus 106, preamble circuitry 156 may be configured to generate preambles for synchronization frames for transmission, and to receive preambles from received synchronization frames. In some embodiments, a downstream synchronization control frame preamble may be sent by the master node 102 every 1024 bits. As discussed above, one or more slave nodes 104 may synchronize to the downstream synchronization control frame preamble and generate local, phase-aligned master clocks from the preamble.

Cyclic redundancy check (CRC) insert circuitry 158 may be configured to generate one or more CRCs for synchronization frames for transmission. Frame/compress circuitry 160 may be configured to take incoming data from the I2S/TDM/PDM transceiver 127 (e.g., from a frame buffer associated with the transceiver 127) and/or the I2C transceiver 129, optionally compress the data, and optionally generate parity check bits or error correction codes (ECC) for the data. A multiplexer (MUX) 162 may multiplex a preamble from the preamble circuitry 156, synchronization frames, and data into a stream for transmission. In some embodiments, the transmit stream may be scrambled by scrambling circuitry 164 before transmission.

For example, in some embodiments, the frame/compress circuitry 160 may apply a floating point compression scheme. In such an embodiment, the control circuitry 154 may transmit 3 bits to indicate how many repeated sign bits are in the number, followed by a sign bit and N-4 bits of data, where N is the size of the data to be transmitted over the bus 106. The use of data compression may be configured by the master node 102 when desired.

In some embodiments, the receive stream entering the node transceiver 120 may be descrambled by the descrambling circuitry 166. A demultiplexer (DEMUX) 168 may demultiplex the preamble, synchronization frames, and data from the receive stream. CRC check circuitry 159 on the receive side may check received synchronization frames for the correct CRC. When the CRC check circuitry 159 identifies a CRC failure in an incoming synchronization control frame 180, the control circuitry 154 may be notified of the failure and will not perform any control commands in the control data 184 of the synchronization control frame 180. When the CRC check circuitry 159 identifies a CRC failure in an incoming synchronization response frame 197, the control circuitry 154 may be notified of the failure and may generate an interrupt for transmission to the host 110 in an interrupt frame. Deframe/decompress circuitry 170 may accept receive data, optionally check its parity, optionally perform error detection and correction (e.g., single error correction-double error detection (SECDED)), optionally decompress the data, and may write the receive data to the I2S/TDM/PDM transceiver 127 (e.g., a frame buffer associated with the transceiver 127) and/or the I2C transceiver 129.

As discussed above, upstream and downstream data may be transmitted along the bus 106 in TDM data slots within a superframe 190. The control circuitry 154 may include registers dedicated to managing these data slots on the bus 106, a number of examples of which are discussed below. When the control circuitry 154 is included in a master node 102, the values in these registers may be programmed into the control circuitry 154 by the host 110. When the control circuitry 154 is included in a slave node 104, the values in these registers may be programmed into the control circuitry 154 by the master node 102.

In some embodiments, the control circuitry 154 may include a downstream slots (DNSLOTS) register. When the node transceiver 120 is included in the master node 102, this register may hold the value of the total number of downstream data slots. This register may also define the number of data slots that will be used for combined I2S/TDM/PDM receive by the I2S/TDM/PDM transceiver 127 in the master node 102. In a slave node 104, this register may define the number of data slots that are passed downstream to the next slave node 104 before or after the addition of locally generated downstream slots, as discussed in further detail below with reference to LDNSLOTS.

In some embodiments, the control circuitry 154 may include a local downstream slots (LDNSLOTS) register. This register may be unused in the master node 102. In a slave node 104, this register may define the number of data slots that the slave node 104 will use and not retransmit. Alternatively, this register may define the number of slots that the slave node 104 may contribute to the downstream data link 106.

In some embodiments, the control circuitry 154 may include an upstream slots (UPSLOTS) register. In the master node 102, this register may hold the value of the total number of upstream data slots. This register may also define the number of slots that will be used for I2S/TDM transmit by the I2S/TDM/PDM transceiver 127 in the master node 102. In a slave node 104, this register may define the number of data slots that are passed upstream before the slave node 104 begins to add its own data.

In some embodiments, the control circuitry 154 may include a local upstream slots (LUPSLOTS) register. This register may be unused in the master node 102. In a slave node 104, this register may define the number of data slots that the slave node 104 will add to the data received from downstream before it is sent upstream. This register may also define the number of data slots that will be used for combined I2S/TDM/PDM receive by the I2S/TDM/PDM transceiver 127 in the slave node 104.

In some embodiments, the control circuitry 154 may include a broadcast downstream slots (BCDNSLOTS) register. This register may be unused in the master node 102. In a slave node 104, this register may define the number of broadcast data slots. In some embodiments, broadcast data slots may always come at the beginning of the data field. The data in the broadcast data slots may be used by multiple slave nodes 104 and may be passed downstream by all slave nodes 104 whether or not they are used.

In some embodiments, the control circuitry 154 may include a slot format (SLOTFMT) register. This register may define the format of data for upstream and downstream transmissions. The data size for the I2S/TDM/PDM transceiver 127 may also be determined by this register. In some embodiments, valid data sizes include 8, 12, 16, 20, 24, 28, and 32 bits. This register may also include bits to enable floating point compression for downstream and upstream traffic. When floating point compression is enabled, the I2S/TDM data size may be 4 bits larger than the data size over the bus 106. All nodes in the system 100 may have the same values for SLOTFMT when data slots are enabled, and the nodes may be programmed by a broadcast write so that all nodes will be updated with the same value.

FIGS. 8-11 illustrate examples of information exchange along the bus 106, in accordance with various embodiments of the bus protocols described herein. In particular, FIGS. 8-11 illustrate embodiments in which each slave node 104 is coupled to one or more speakers and/or one or more microphones as the peripheral device 108. This is simply illustrative, as any desired arrangement of peripheral device 108 may be coupled to any particular slave node 104 in accordance with the techniques described herein.

Figure 8:
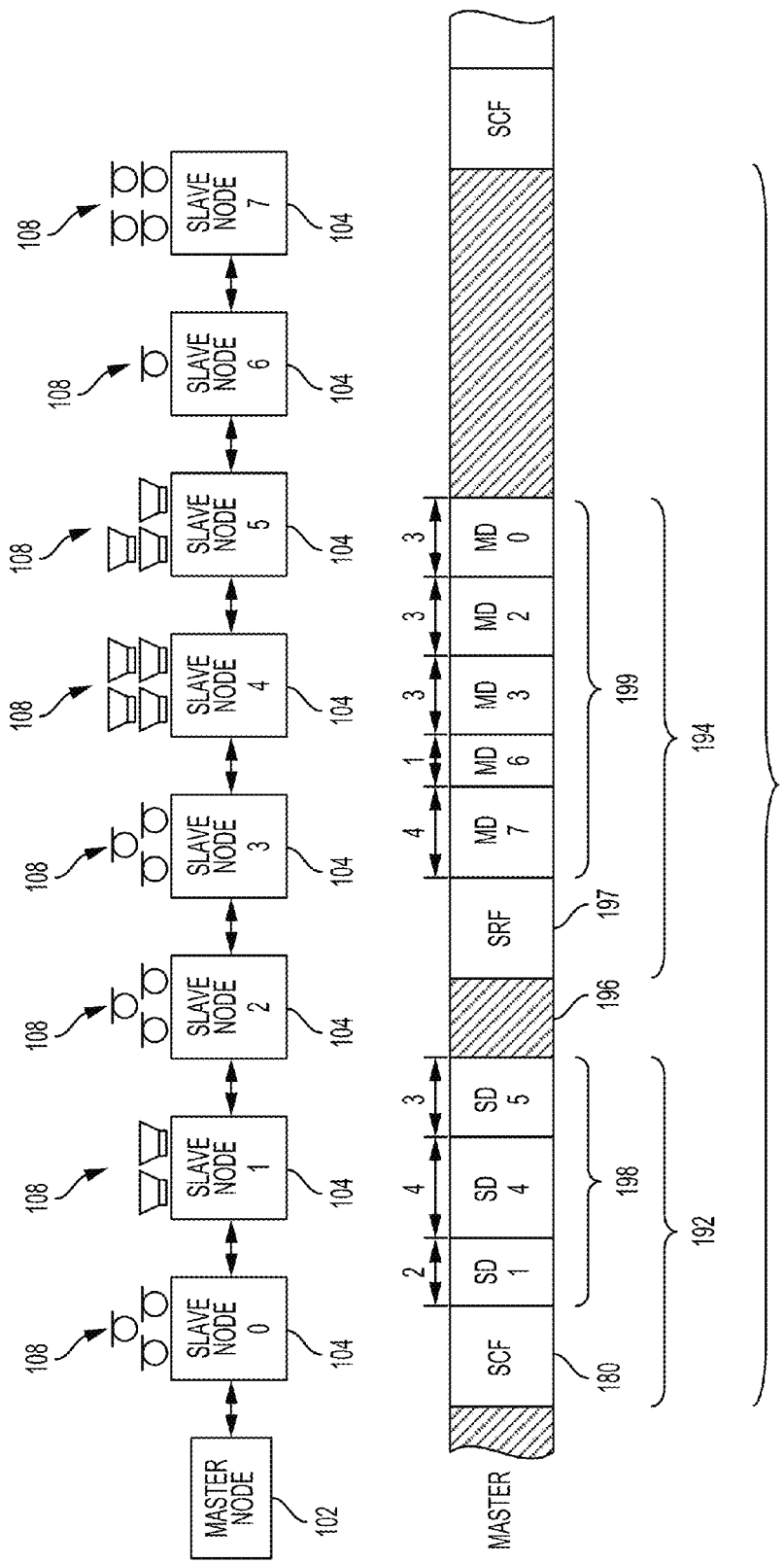
FIGS. 8-11 illustrate examples of information exchange along a two-wire bus, in accordance with various embodiments of the bus protocols described herein.

To begin, FIG. 8 illustrates signaling and timing considerations for bi-directional communication on the bus 106, in accordance with various embodiments. The slave nodes 104 depicted in FIG. 8 have various numbers of sensor/actuator elements, and so different amounts of data may be sent to, or received from, the various slave nodes 104. Specifically, slave node 1 has two elements, slave node 4 has four elements, and slave node 5 has three elements, so the data transmitted by the master node 102 includes two time slots for slave node 1, four time slots for slave node 4, and three time slots for slave node 5. Similarly, slave node 0 has three elements, slave node 2 has three elements, slave node 3 has three elements, slave node 6 has one element, and slave node 7 has four elements, so the data transmitted upstream by those slave nodes 104 includes the corresponding number of time slots. It should be noted that there need not have to be a one-to-one correlation between elements and time slots. For example, a microphone array, included in the peripheral device 108, having three microphones may include a digital signal processor that combines signals from the three microphones (and possibly also information received from the master node 102 or from other slave nodes 104) to produce a single data sample, which, depending on the type of processing, could correspond to a single time slot or multiple time slots.

In FIG. 8, the master node 102 transmits a synchronization control frame (SCF) followed by data for speakers coupled to specific slave nodes 104 (SD). Each successive slave node 104 forwards the synchronization control frame and also forwards at least any data destined for downstream slave nodes 104. A particular slave node 104 may forward all data or may remove data destined for that slave node 104. When the last slave node 104 receives the synchronization control frame, that slave node 104 transmits the synchronization response frame (SRF) optionally followed by any data that the slave node 104 is permitted to transmit. Each successive slave node 104 forwards the synchronization response frame along with any data from downstream slave nodes 104 and optionally inserts data from one or more microphones coupled to the particular slave nodes 104 (MD). In the example of FIG. 8, the master node 102 sends data to slave nodes 1, 4, and 5 (depicted in FIG. 8 as active speakers) and receives data from slave nodes 7, 6, 3, 2, and 0 (depicted in FIG. 8 as microphone arrays).

Figure 9:
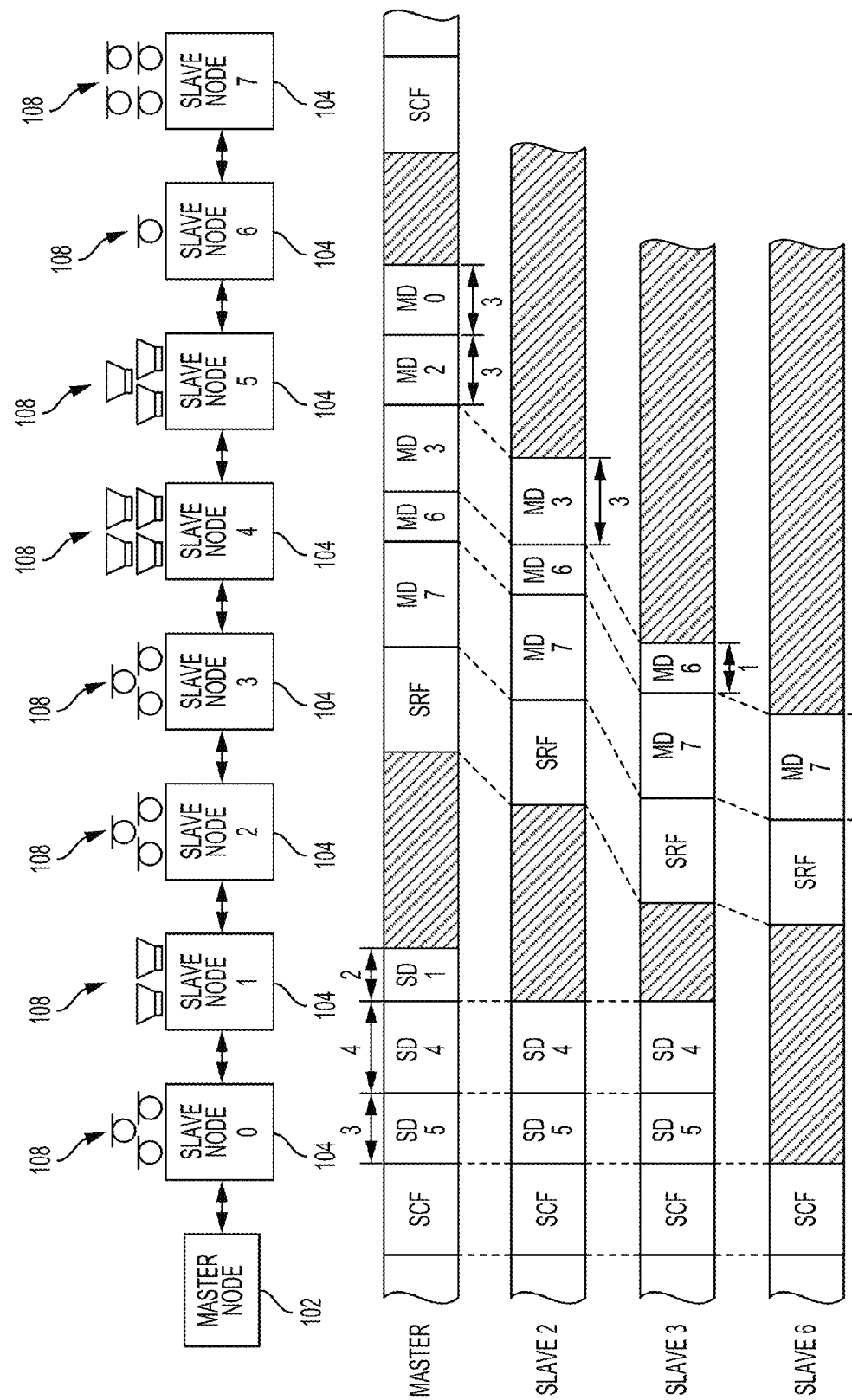

FIG. 9 schematically illustrates the dynamic removal of data from a downstream transmission and insertion of data into an upstream transmission, from the perspective of the downstream DS transceiver 124, in accordance with various embodiments. In FIG. 9, as in FIG. 8, the master node 102 transmits a synchronization control frame (SCF) followed by data for slave nodes 1, 4, and 5 (SD) in reverse order (e.g., data for slave node 5 is followed by data for slave node 4, which is followed by data for slave node 1, etc.) (see the row labeled MASTER). When slave node 1 receives this transmission, slave node 1 removes its own data and forwards to slave node 2 only the synchronization control frame followed by the data for slave nodes 5 and 4. Slave nodes 2 and 3 forward the data unchanged (see the row labeled SLAVE 2), such that the data forwarded by slave node 1 is received by slave node 4 (see the row labeled SLAVE 3). Slave node 4 removes its own data and forwards to slave node 5 only the synchronization control frame followed by the data for slave node 5, and, similarly, slave node 5 removes its own data and forwards to slave node 6 only the synchronization control frame. Slave node 6 forwards the synchronization control frame to slave node 7 (see the row labeled SLAVE 6).

At this point, slave node 7 transmits to slave node 6 the synchronization response frame (SRF) followed by its data (see the row labeled SLAVE 6). Slave node 6 forwards to slave node 5 the synchronization response frame along with the data from slave node 7 and its own data, and slave node 5 in turn forwards to slave node 4 the synchronization response frame along with the data from slave nodes 7 and 6. Slave node 4 has no data to add, so it simply forwards the data to slave node 3 (see the row labeled SLAVE 3), which forwards the data along with its own data to slave node 2 (see the row labeled SLAVE 2), which in turn forwards the data along with its own data to slave node 1. Slave node 1 has no data to add, so it forwards the data to slave node 0, which forwards the data along with its own data. As a result, the master node 102 receives the synchronization response frame followed by the data from slave nodes 7, 6, 3, 2, and 0 (see the row labeled MASTER).

Figure 10:
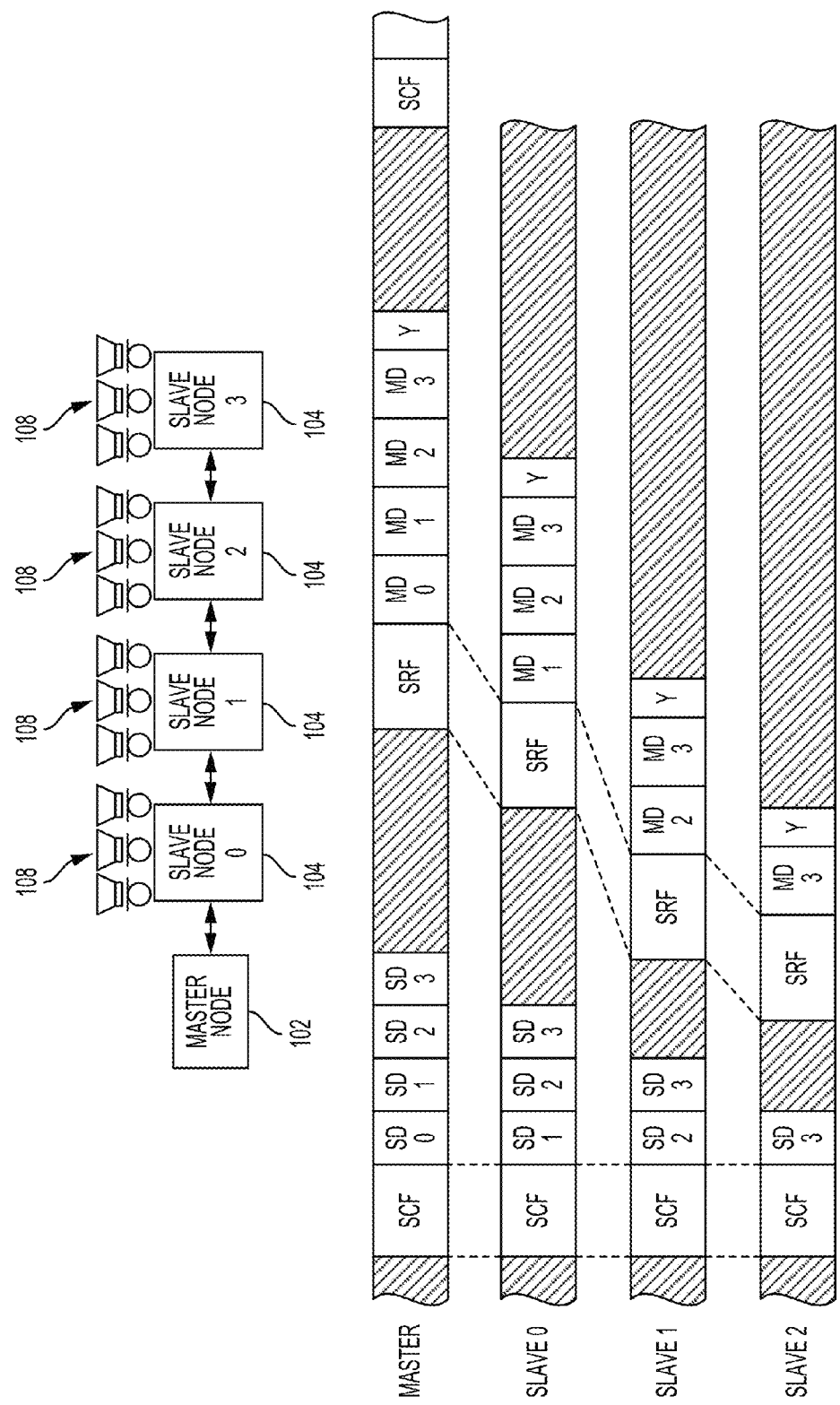

FIG. 10 illustrates another example of the dynamic removal of data from a downstream transmission and insertion of data into an upstream transmission, from the perspective of the downstream DS transceiver 124, as in FIG. 9, although in FIG. 10, the slave nodes 104 are coupled with both sensors and actuators as the peripheral device 108 such that the master node 102 sends data downstream to all of the slave nodes 104 and receives data back from all of the slave nodes 104. Also, in FIG. 10, the data is ordered based on the node address to which it is destined or from which it originates. The data slot labeled "Y" may be used for a data integrity check or data correction.

Figure 11:
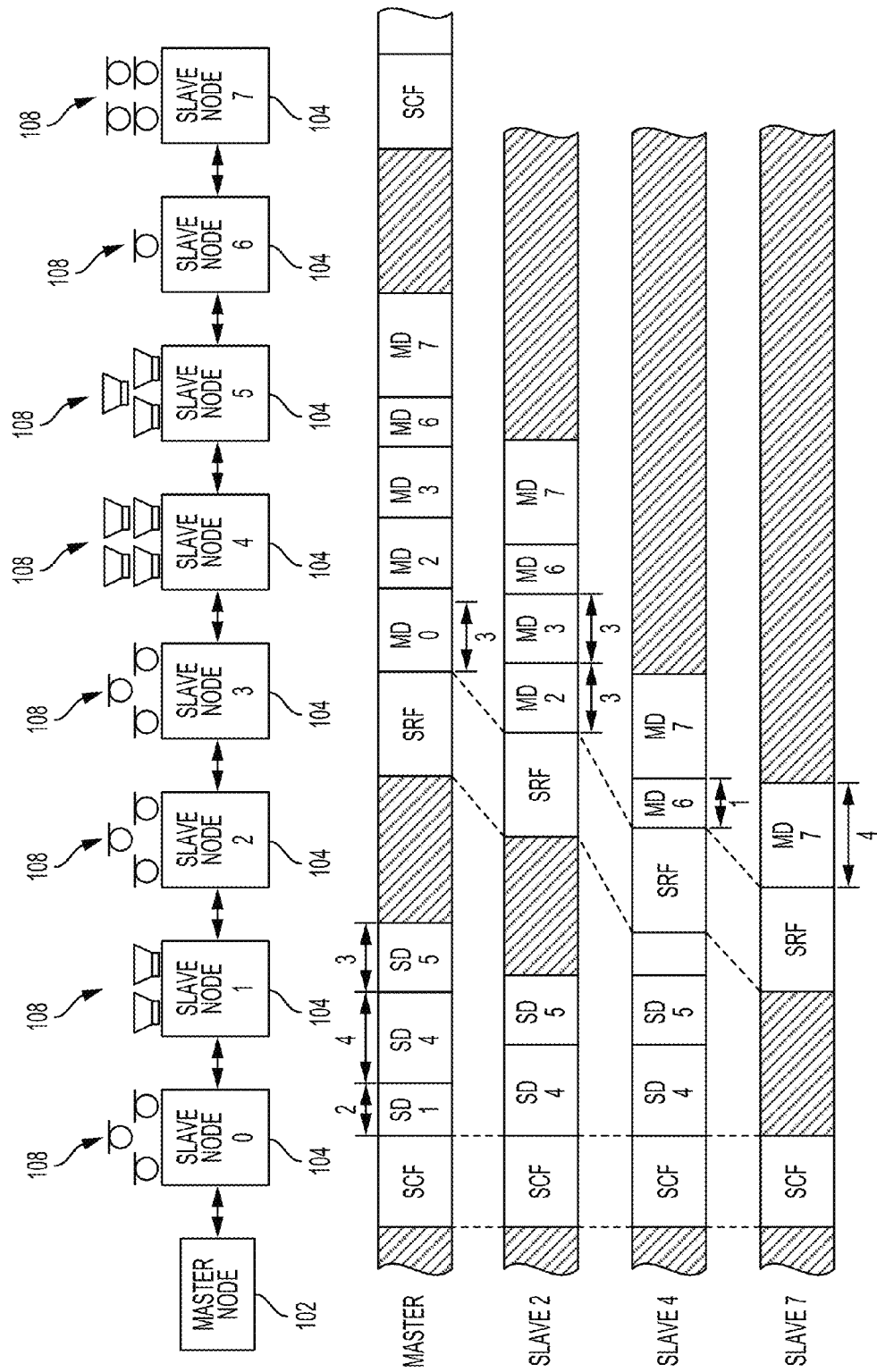

FIG. 11 illustrates another example of the dynamic removal of data from a downstream transmission and insertion of data into an upstream transmission, from the perspective of the downstream DS transceiver 124, as in FIG. 9, although in FIG. 11, the data is conveyed downstream and upstream in sequential order rather than reverse order. Buffering at each slave node 104 allows for selectively adding, removing, and/or forwarding data.

As discussed above, each slave node 104 may remove data from downstream or upstream transmissions and/or may add data to downstream or upstream transmissions. Thus, for example, the master node 102 may transmit a separate sample of data to each of a number of slave nodes 104, and each such slave node 104 may remove its data sample and forward only data intended for downstream slaves. On the other hand, a slave node 104 may receive data from a downstream slave node 104 and forward the data along with additional data. One advantage of transmitting as little information as needed is to reduce the amount of power consumed collectively by the system 100.

The system 100 may also support broadcast transmissions (and multicast transmissions) from the master node 102 to the slave nodes 104, specifically through configuration of the downstream slot usage of the slave nodes 104. Each slave node 104 may process the broadcast transmission and pass it along to the next slave node 104, although a particular slave node 104 may "consume" the broadcast message, (i.e., not pass the broadcast transmission along to the next slave node 104).

The system 100 may also support upstream transmissions (e.g., from a particular slave node 104 to one or more other slave nodes 104). Such upstream transmissions can include unicast, multicast, and/or broadcast upstream transmissions. With upstream addressing, as discussed above with reference to downstream transmissions, a slave node 104 may determine whether or not to remove data from an upstream transmission and/or whether or not to pass an upstream transmission along to the next upstream slave node 104 based on configuration of the upstream slot usage of the slave nodes 104. Thus, for example, data may be passed by a particular slave node 104 to one or more other slave nodes 104 in addition to, or in lieu of, passing the data to the master node 102. Such slave-slave relationships may be configured, for example, via the master node 102.

Thus, in various embodiments, the slave nodes 104 may operate as active/intelligent repeater nodes, with the ability to selectively forward, drop, and add information. The slave nodes 104 may generally perform such functions without necessarily decoding/examining all of the data, since each slave node 104 knows the relevant time slot(s) within which it will receive/transmit data, and hence can remove data from or add data into a time slot. Notwithstanding that the slave nodes 104 may not need to decode/examine all data, the slave nodes 104 may typically re-clock the data that it transmits/forwards. This may improve the robustness of the system 100.

Figure 12:
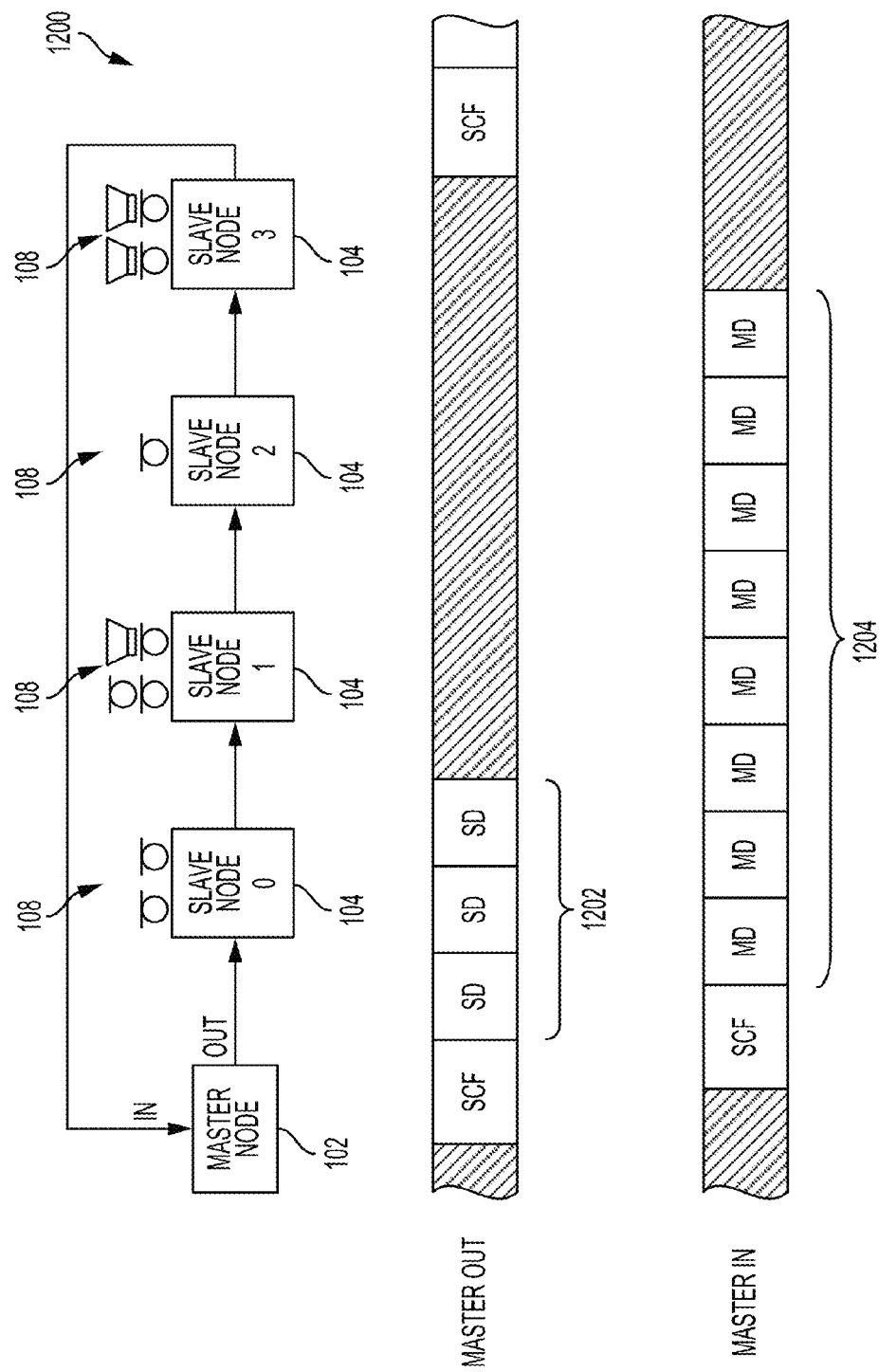
FIG. 12 illustrates a ring topology for the two-wire bus and a unidirectional communication scheme thereon, in accordance with various embodiments.

In some embodiments, the bus 106 may be configured for unidirectional communications in a ring topology. For example, FIG. 12 illustrates an arrangement 1200 of the master node 102 and four slave nodes 104 in a ring topology, and illustrates signaling and timing considerations for unidirectional communication in the arrangement 1200, in accordance with various embodiments. In such embodiments, the transceivers 120 in the nodes may include a receive-only transceiver (MASTER IN) and a transmit-only transceiver (MASTER OUT), rather than two bi-directional transceivers for upstream and downstream communication.

In the link-layer synchronization scheme illustrated in FIG. 12, the master node 102 transmits a synchronization control frame (SCF) 180, optionally followed by "downstream" data 1202 for the three speakers coupled to various slave nodes 104 (the data for the different speakers may be arranged in any suitable order, as discussed above with reference to FIGS. 8-11), and each successive slave node 104 forwards the synchronization control frame 180 along with any "upstream" data from prior slave nodes 104 and "upstream" data of its own to provide "upstream" data 1204 (e.g., the data from the eight different microphones may be arranged in any suitable order, as discussed above with reference to FIGS. 8-11).

As described herein, data may be communicated between elements of the system 100 in any of a number of ways. In some embodiments, data may be sent as part of a set of synchronous data slots upstream (e.g., using the data slots 199) by a slave node 104 or downstream (e.g., using the data slots 198) by a slave node 104 or a master node 102. The volume of such data may be adjusted by changing the number of bits in a data slot, or including extra data slots. Data may also be communicated in the system 100 by inclusion in a synchronization control frame 180 or a synchronization response frame 197. Data communicated this way may include I2C control data from the host 110 (with a response from a peripheral device 108 associated with a slave node 104); accesses to registers of the slave nodes 104 (e.g., for discovery and configuration of slots and interfaces) that may include write access from the host 110/master node 102 to a slave node 104 and read access from a slave node 104 to the host 110/master node 102; and event signaling via interrupts from a peripheral device 108 to the host 110. In some embodiments, GPIO pins may be used to convey information from a slave node 104 to the master node 102 (e.g., by having the master node 102 poll the GPIO pins over I2C, or by having a node transceiver 120 of a slave node 104 generate an interrupt at an interrupt request pin). For example, in some such embodiments, a host 110 may send information to the master node 102 via I2C, and then the master node 102 may send that information to the slave via the GPIO pins. Any of the types of data discussed herein as transmitted over the bus 106 may be transmitted using any one or more of these communication pathways. Other types of data and data communication techniques within the system 100 may be disclosed herein.

Figure 13:
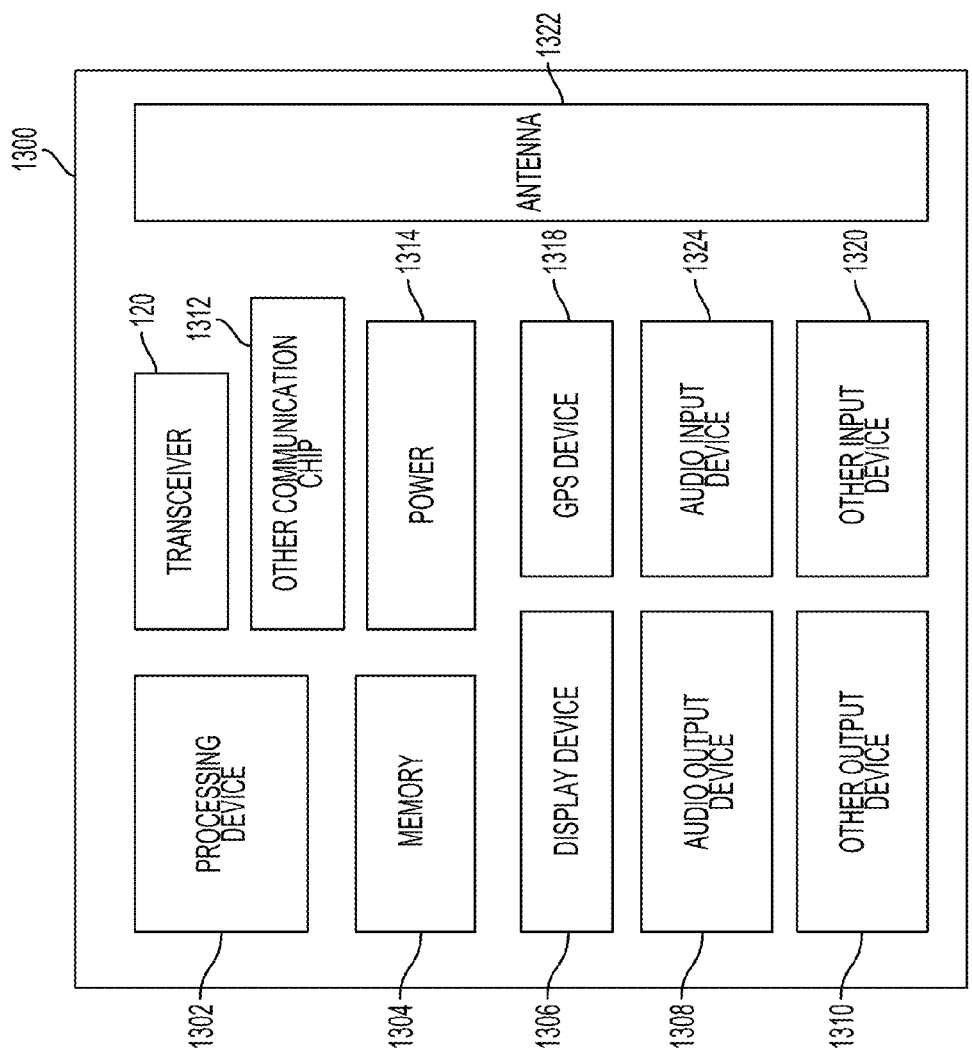
FIG. 13 schematically illustrates a device that may serve as a node or host in the system of FIG. 1, in accordance with various embodiments.

Embodiments of the present disclosure may be implemented into a system using any suitable hardware and/or software to configure as desired. FIG. 13 schematically illustrates a device 1300 that may serve as a host or a node (e.g., a host 110, a master node 102, or a slave node 104) in the system 100, in accordance with various embodiments. A number of components are illustrated in FIG. 13 as included in the device 1300, but any one or more of these components may be omitted or duplicated, as suitable for the application.

Additionally, in various embodiments, the device 1300 may not include one or more of the components illustrated in FIG. 13, but the device 1300 may include interface circuitry for coupling to the one or more components. For example, the device 1300 may not include a display device 1306, but may include display device interface circuitry (e.g., a connector and driver circuitry) to which a display device 1306 may be coupled. In another set of examples, the device 1300 may not include an audio input device 1324 or an audio output device 1308, but may include audio input or output device interface circuitry (e.g., connectors and supporting circuitry) to which an audio input device 1324 or audio output device 1308 may be coupled.

The device 1300 may include the node transceiver 120, in accordance with any of the embodiments disclosed herein, for managing communication along the bus 106 when the device 1300 is coupled to the bus 106. The device 1300 may include a processing device 1302 (e.g., one or more processing devices), which may be included in the node transceiver 120 or separate from the node transceiver 120. As used herein, the term "processing device" may refer to any device or portion of a device that processes electronic data from registers and/or memory to transform that electronic data into other electronic data that may be stored in registers and/or memory. The processing device 1302 may include one or more digital signal processors (DSPs), application-specific integrated circuits (ASICs), central processing units (CPUs), graphics processing units (GPUs), cryptoprocessors, or any other suitable processing devices. The device 1300 may include a memory 1304, which may itself include one or more memory devices such as volatile memory (e.g., dynamic random access memory (DRAM)), non-volatile memory (e.g., read-only memory (ROM)), flash memory, solid state memory, and/or a hard drive.

In some embodiments, the memory 1304 may be employed to store a working copy and a permanent copy of programming instructions to cause the device 1300 to perform any suitable ones of the techniques disclosed herein. In some embodiments, machine-accessible media (including non-transitory computer-readable storage media), methods, systems, and devices for performing the above-described techniques are illustrative examples of embodiments disclosed herein for communication over a two-wire bus. For example, a computer-readable media (e.g., the memory 1304) may have stored thereon instructions that, when executed by one or more of the processing devices included in the processing device 1302, cause the device 1300 to perform any of the techniques disclosed herein.

In some embodiments, the device 1300 may include another communication chip 1312 (e.g., one or more other communication chips). For example, the communication chip 1312 may be configured for managing wireless communications for the transfer of data to and from the device 1300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

The communication chip 1312 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The one or more communication chips 1312 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The one or more communication chips 1312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The one or more communication chips 1312 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1312 may operate in accordance with other wireless protocols in other embodiments. The device 1300 may include an antenna 1322 to facilitate wireless communications and/or to receive other wireless communications (such as AM or FM radio transmissions).

In some embodiments, the communication chip 1312 may manage wired communications using a protocol other than the protocol for the bus 106 described herein. Wired communications may include electrical, optical, or any other suitable communication protocols. Examples of wired communication protocols that may be enabled by the communication chip 1312 include Ethernet, controller area network (CAN), I2C, media-oriented systems transport (MOST), or any other suitable wired communication protocol.

As noted above, the communication chip 1312 may include multiple communication chips. For instance, a first communication chip 1312 may be dedicated to shorter-range wireless communications such as Wi-Fi or Bluetooth, and a second communication chip 1312 may be dedicated to longer-range wireless communications such as GPS, EDGE, GPRS, CDMA, WiMAX, LTE, EV-DO, or others. In some embodiments, a first communication chip 1312 may be dedicated to wireless communications, and a second communication chip 1312 may be dedicated to wired communications.

The device 1300 may include battery/power circuitry 1314. The battery/power circuitry 1314 may include one or more energy storage devices (e.g., batteries or capacitors) and/or circuitry for coupling components of the device 1300 to an energy source separate from the device 1300 (e.g., AC line power, voltage provided by a car battery, etc.). For example, the battery/power circuitry 1314 may include the upstream filtering circuitry 132 and the downstream filtering circuitry 131 discussed above with reference to FIG. 2 and could be charged by the bias on the bus 106.

The device 1300 may include a display device 1306 (or corresponding interface circuitry, as discussed above). The display device 1306 may include any visual indicators, such as a heads-up display, a computer monitor, a projector, a touchscreen display, a liquid crystal display (LCD), a light-emitting diode display, or a flat panel display, for example.

The device 1300 may include an audio output device 1308 (or corresponding interface circuitry, as discussed above). The audio output device 1308 may include any device that generates an audible indicator, such as speakers, headsets, or earbuds, for example.

The device 1300 may include an audio input device 1324 (or corresponding interface circuitry, as discussed above). The audio input device 1324 may include any device that generates a signal representative of a sound, such as microphones, microphone arrays, or digital instruments (e.g., instruments having a musical instrument digital interface (MIDI) output).

The device 1300 may include a global positioning system (GPS) device 1318 (or corresponding interface circuitry, as discussed above). The GPS device 1318 may be in communication with a satellite-based system and may receive a location of the device 1300, as known in the art.

The device 1300 may include another output device 1310 (or corresponding interface circuitry, as discussed above). Examples of the other output device 1310 may include an audio codec, a video codec, a printer, a wired or wireless transmitter for providing information to other devices, or an additional storage device. Additionally, any suitable ones of the peripheral devices 108 discussed herein may be included in the other output device 1310.

The device 1300 may include another input device 1320 (or corresponding interface circuitry, as discussed above). Examples of the other input device 1320 may include an accelerometer, a gyroscope, an image capture device, a keyboard, a cursor control device such as a mouse, a stylus, a touchpad, a bar code reader, a Quick Response (QR) code reader, or a radio frequency identification (RFID) reader. Additionally, any suitable ones of the sensors or peripheral devices 108 discussed herein may be included in the other input device 1320.

Any suitable ones of the display, input, output, communication, or memory devices described above with reference to the device 1300 may serve as the peripheral device 108 in the system 100. Alternatively or additionally, suitable ones of the display, input, output, communication, or memory devices described above with reference to the device 1300 may be included in a host (e.g., the host 110) or a node (e.g., a master node 102 or a slave node 104).

As noted above, the peripheral devices 108 coupled to a slave node 104 may include one or more microphones. In some applications, multiple microphones may be coupled to one or more slave nodes 104 (as peripheral devices 108) in the system 100, and those multiple microphones may be physically arranged in an array so as to achieve a desired directionality of audio detection. For example, two (or more) microphones may be arranged in a line perpendicular to the direction from which sounds are arriving (e.g., from a location at which a speaker of interest is seated); this arrangement may be referred to as a broadside array, and signal processing techniques may be used to better detect sounds arising from the location of interest than would be achievable with a single microphone. In another example, two (or more) microphones may be arranged so that the microphones are in line with a location of interest; this arrangement may be referred to as an end-fire array, and signal processing techniques (different from those used with a broadside array) may be used to better detect sounds arising from the location of interest than would be achievable with a single microphone.

When an area includes multiple potential locations of interest, multiple dedicated microphones may be assigned to each location (e.g., in a broadside array, an end-fire array, or other array). However, the number of microphones required for such an approach may be excessive for certain applications (e.g., those in which limited physical space is available, and/or those in which there are too few communication channels available to cover all of the microphones). For example, if two microphones are dedicated to each of the five seats in a typical automobile (the front left seat, the front right seat, the rear left seat, the rear right seat, and the center rear seat), ten total microphones would be required, along with their attendant cabling and physical placement.

As noted above, disclosed herein are embodiments of four-microphone arrays that may be flexibly utilized to achieve directional reception in many different directions. These arrays may enable directional reception for many locations of interest without the large number of microphones required by a more conventional approach. In some embodiments, all four of the microphones may be coupled to a common substrate along with a node transceiver 120 (FIG. 2), providing an integrated apparatus that includes both a slave node 104 and the microphones as the peripheral devices 108. Related systems, devices, methods, and other embodiments are also disclosed herein. Although reference is made below to particular orientations of the arrays in space (e.g., in a vehicle, with reference to "left" and "right" and "front" and "rear"), these are descriptive, non-limiting terms, and they may be applied relative to any positioning of any of the arrays disclosed herein. For example, if any of the microphone arrays disclosed herein are located at the back of a passenger vehicle (instead of at the front), references to the "front" may apply to the back of the vehicle, references to the "back" may apply to the front of the vehicle, etc.

Figure 14A:
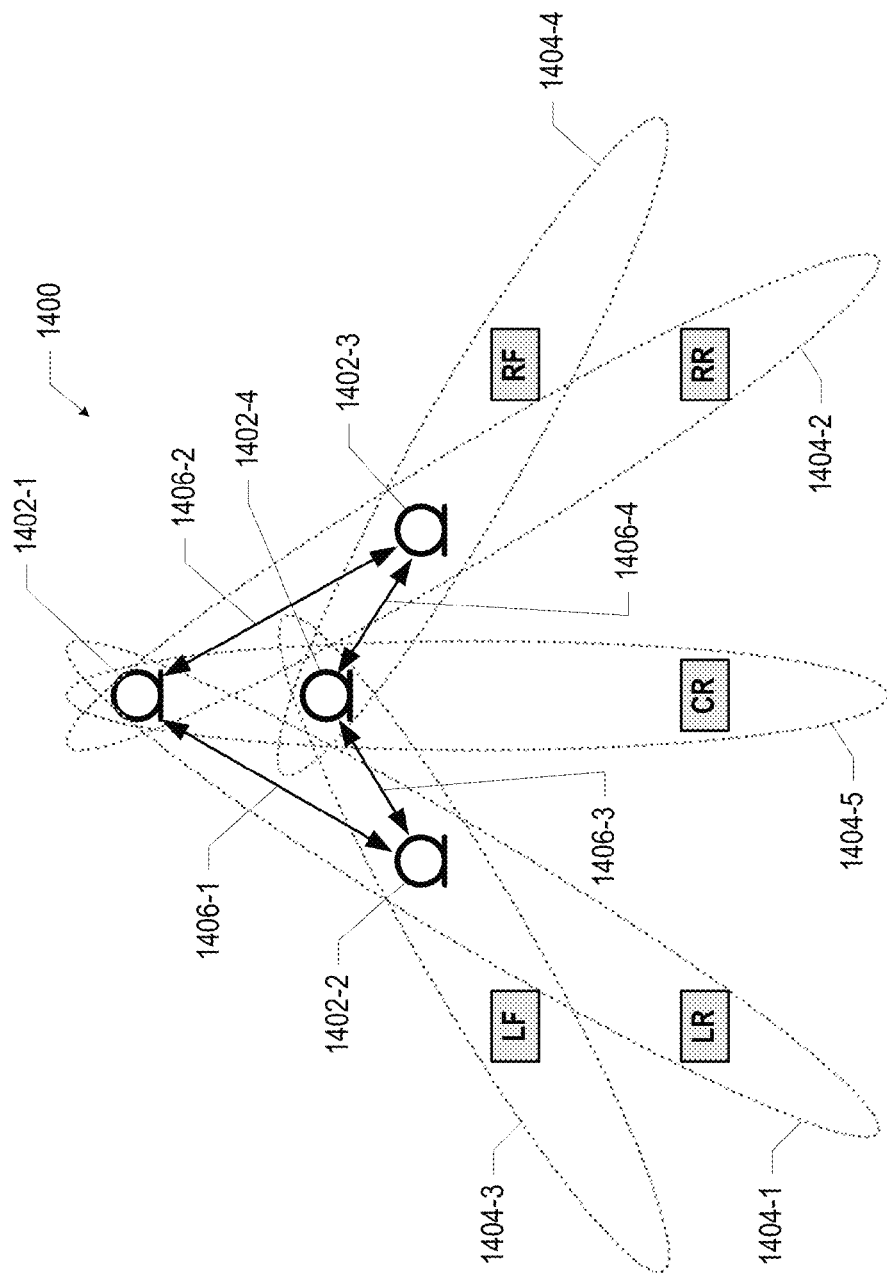
FIGS. 14A-D, 15, and 16A-B are plan views of various four-microphone arrays and usages, in accordance with some embodiments.
Figure 14B:
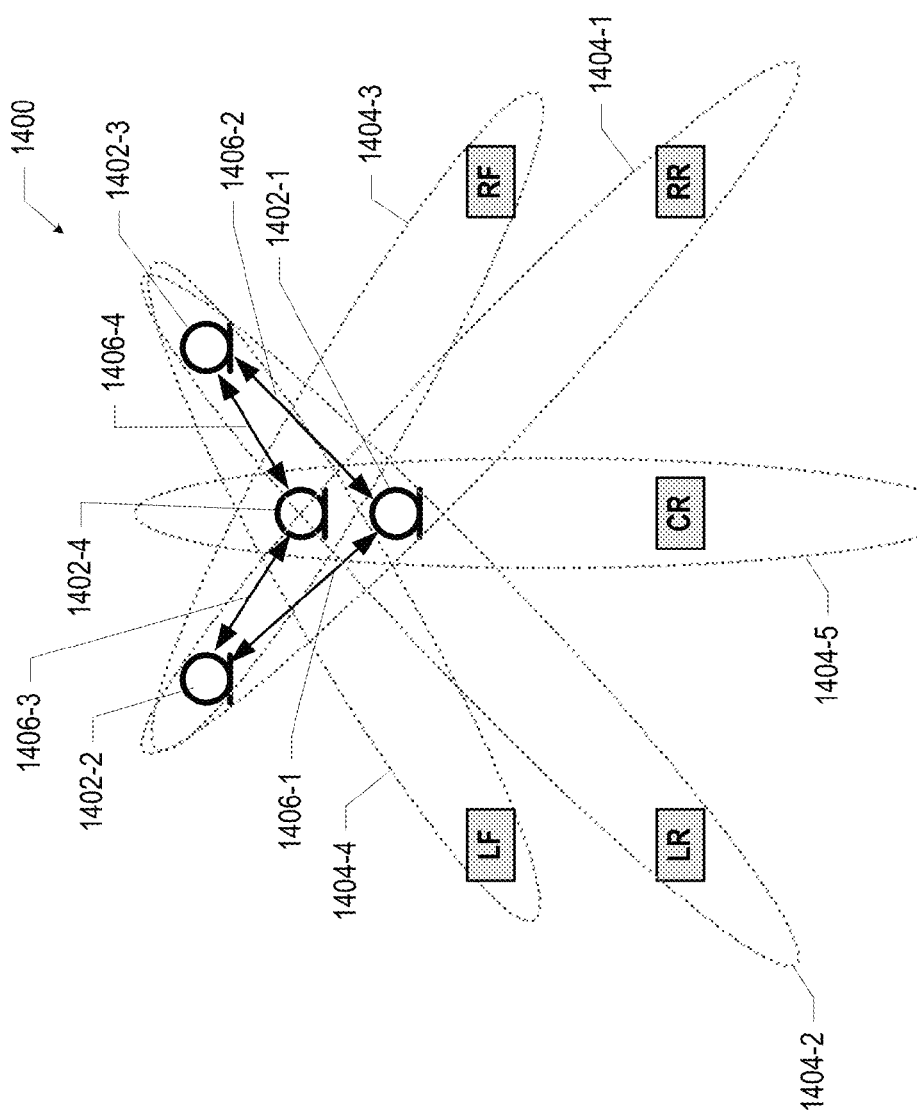
Figure 14C:
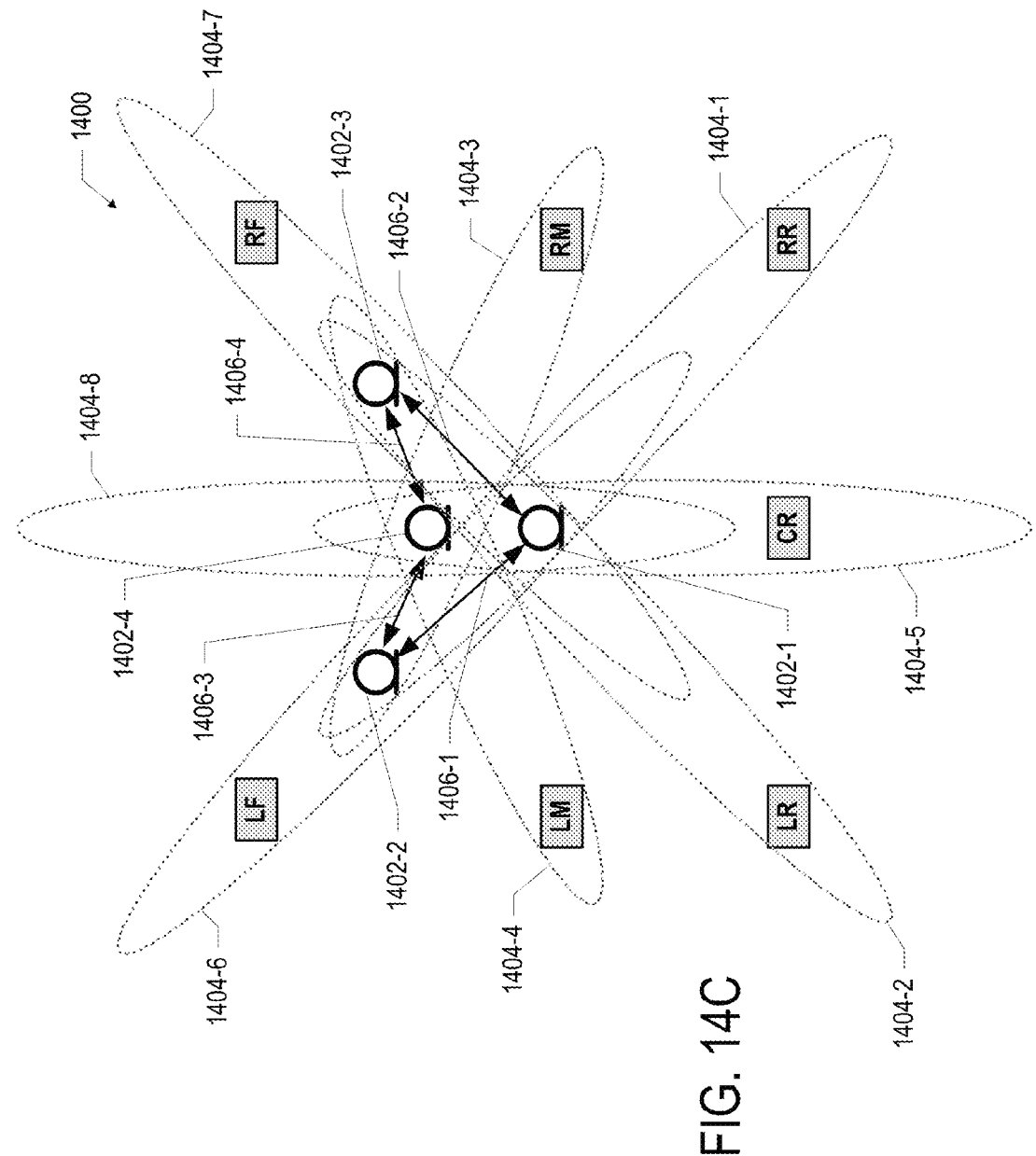
Figure 14D:
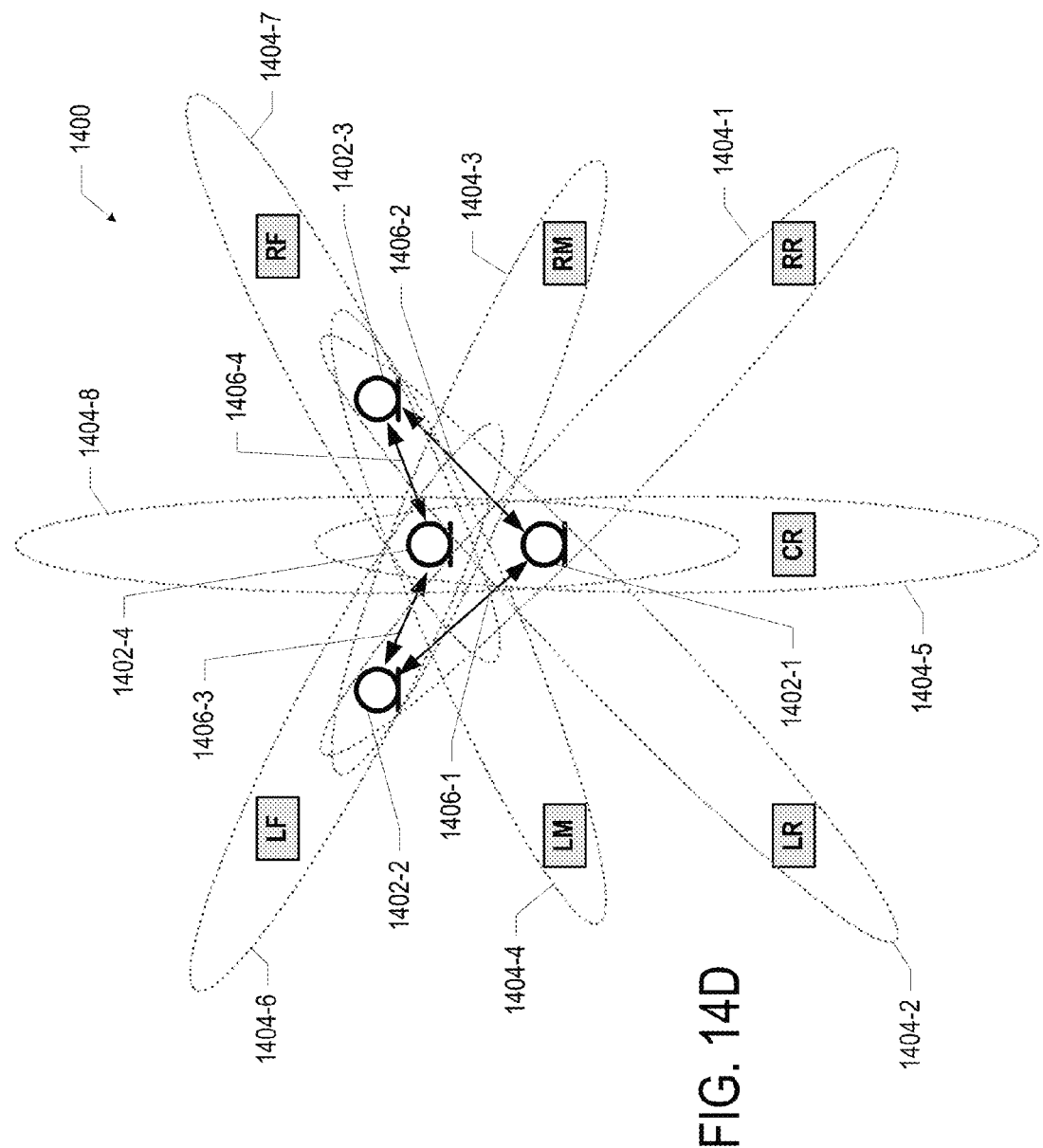
Figure 15:
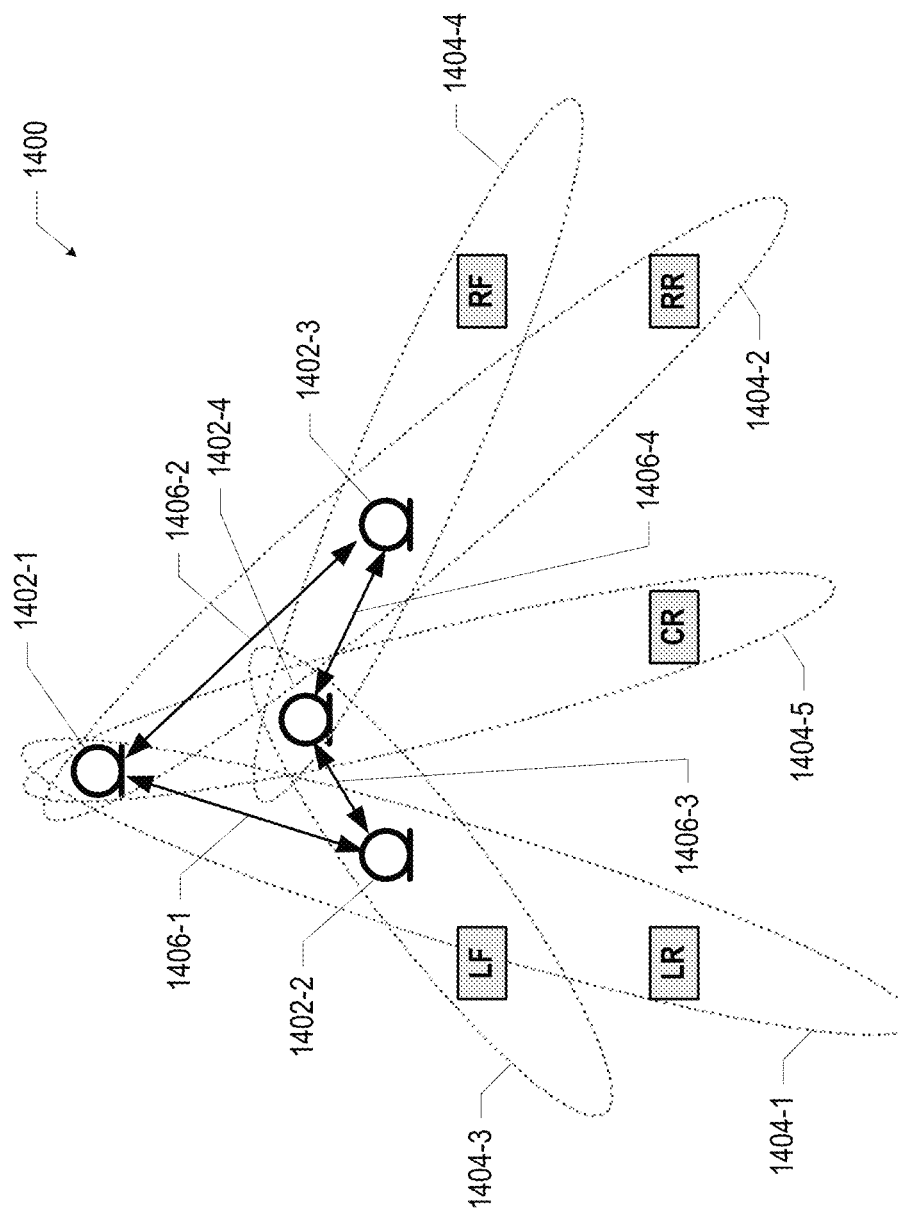

FIGS. 14-16 are plan views of various four-microphone arrays 1400 and usages, in accordance with some embodiments. In the array 1400 of FIG. 14A, a first microphone 1402-1, a second microphone 1402-2, and a third microphone 1402-3 are positioned so as to provide the vertices of a triangle in a plan view of the array 1400. A fourth microphone 1402-4 is positioned "within" this triangle. As shown in FIG. 14A, the four microphones 1402 of the array 1400 may provide the vertices of a concave shape. Any of the microphones 1402 discussed herein may utilize any suitable microphone technology. For example, in some embodiments, the microphones 1402 may be microelectromechanical systems (MEMS) microphones. In some embodiments, the outputs of the microphones 1402 may be digital signals (e.g., PDM or I2S/TDM signals). In other embodiments, the outputs of the microphones 1402 may be analog signals; these signals may be digitized by a separate analog to digital converter (ADC) if subsequent digital processing is desired. A block diagram of an example microphone 1402 is discussed below with reference to FIG. 19.

Different pairs of the microphones 1402 of FIG. 14A may be used together to provide end-fire arrays forming "beams" of enhanced reception with different directionality. For example, the first microphone 1402-1 and the second microphone 1402-2 may be used together as an end-fire array to form a reception beam 1404-1. When the array 1400 is positioned in the dashboard of a vehicle, for example, the reception beam 1404-1 may be directed to the left rear (LR) seat (as shown), and may provide enhanced and selective detection of the speech of a passenger in the left rear seat, for example.

Similarly, as shown in FIG. 14A, the first microphone 1402-1 and the third microphone 1402-3 may be used together as an end-fire array to form a reception beam 1404-2; the second microphone 1402-2 and the fourth microphone 1402-4 may be used together as an end-fire array to form a reception beam 1404-3; the third microphone 1402-3 and the fourth microphone 1402-4 may be used together as an end-fire array to form a reception beam 1404-4; and the first microphone 1402-1 and the fourth microphone 1402-4 may be used together as an end-fire array to form a reception beam 1404-5. When the array 1400 is positioned in the dashboard of a vehicle, as discussed above with reference to the reception beam 1404-1, the reception beam 1404-2 may be directed to the right rear (RR) seat, the reception beam 1404-3 may be directed to the left front (LF) seat, the reception beam 1404-4 may be directed to the right front (RF) seat, and the reception beam 1404-5 may be directed to the center rear (CR) seat, as shown.

The array 1400 may thus enable directional reception in at least five different directions using only four microphones 1402. As noted above, in applications in which reducing hardware overhead is desirable, the array 1400 of FIG. 14A may provide flexible and powerful functionality while incurring relatively small hardware and space costs. In some embodiments, data from all of the microphones 1402 may be provided to another device in the system 100 (e.g., a slave node 104, the master node 102, or the host 110), and that device may selectively process the microphone data to achieve directional reception in one or more desired directions (e.g., using known beamforming techniques). In other embodiments, a device in the system 100 (e.g., a slave node 104, the master node 102, or the host 110) may ignore or power down one or more of the microphones 1402 in the array 1400 until their data is needed, at which point the data from these "deactivated" microphones will flow into the system 100 and their data may be processed.

The microphones 1402-1, 1402-2 and 1402-3 may form an equilateral triangle, an isosceles triangle or scalene triangle to adjust for the specific location and sound sources. In some embodiments, the distance 1406-1 between the first microphone 1402-1 and the second microphone 1402-2 may be equal to the distance 1406-2 between the first microphone 1402-1 and the third microphone 1402-3 (e.g., as illustrated in FIG. 14A). The distances 1406 may be measured between any suitable corresponding locations on the different microphones 1402 (e.g., between corresponding mounting holes, corresponding registration marks, corresponding geometry, etc.) or as a minimum or maximum distance between points on the microphones 1402. In some embodiments, the distance 1406-1 and the distance 1406-2 may be different (e.g., as discussed below with reference to FIG. 15). In some embodiments, the distance 1406-3 between the second microphone 1402-2 and the fourth microphone 1402-4 may be equal to the distance 1406-4 between the third microphone 1402-3 and the fourth microphone 1402-4 (e.g., as illustrated in FIG. 14A). In some embodiments, the distance 1406-3 and the distance 1406-4 may be different (e.g., as discussed below with reference to FIG. 15). In embodiments in which the distance 1406-1 is equal to the distance 1406-2, and the distance 1406-3 is equal to the distance 1406-4, the array 1400 may be symmetric about an axis extending between the first microphone 1402-1 and the fourth microphone 1402-4. In some embodiments, the distances 1406 in the arrays 1400 disclosed herein may be less than 50 millimeters (e.g., less than 30 millimeters, between 10 and 40 millimeters, or between 15 and 30 millimeters).

FIG. 14B is a plan view of another four-microphone array 1400, in accordance with some embodiments. The array 1400 of FIG. 14B may be regarded as a "reverse" application of the array 1400 of FIG. 14A, as discussed below. In the array 1400 of FIG. 14B, as in the array 1400 of FIG. 14A, a first microphone 1402-1, a second microphone 1402-2, and a third microphone 1402-3 are positioned so as to provide the vertices of a triangle in a plan view of the array 1400. A fourth microphone 1402-4 is positioned "within" this triangle. As shown in FIG. 14B, the four microphones 1402 of the array 1400 may provide the vertices of a concave shape.

Different pairs of the microphones 1402 of FIG. 14B may be used together to provide end-fire arrays forming "beams" of enhanced reception with different directionality, as discussed above with reference to FIG. 14A. For example, the first microphone 1402-1 and the second microphone 1402-2 may be used together as an end-fire array to form a reception beam 1404-1, the first microphone 1402-1 and the third microphone 1402-3 may be used together as an end-fire array to form a reception beam 1404-2; the second microphone 1402-2 and the fourth microphone 1402-4 may be used together as an end-fire array to form a reception beam 1404-3; the third microphone 1402-3 and the fourth microphone 1402-4 may be used together as an end-fire array to form a reception beam 1404-4; and the first microphone 1402-1 and the fourth microphone 1402-4 may be used together as an end-fire array to form a reception beam 1404-5. When the array 1400 is positioned in the dashboard of a vehicle, for example, the reception beam 1404-1 may be directed to the right rear (RR) seat, the reception beam 1404-2 may be directed to the left rear (LR) seat, the reception beam 1404-3 may be directed to the right front (RF) seat, the reception beam 1404-4 may be directed to the left front (LF) seat, and the reception beam 1404-5 may be directed to the center rear (CR) seat, as shown. Thus, like the array 1400 of FIG. 14A, the array 1400 of FIG. 14B may enable directional reception in at least five different directions using only four microphones 1402.

FIG. 14C is a plan view of another usage of the four-microphone array 1400 of FIG. 14B, in accordance with some embodiments. In the array 1400 of FIG. 14C, as in the array 1400 of FIG. 14B, a first microphone 1402-1, a second microphone 1402-2, and a third microphone 1402-3 are positioned so as to provide the vertices of a triangle in a plan view of the array 1400. A fourth microphone 1402-4 is positioned "within" this triangle. As shown in FIG. 14C, the four microphones 1402 of the array 1400 may provide the vertices of a concave shape.

Different pairs of the microphones 1402 of FIG. 14C may be used together to provide end-fire arrays forming "beams" of enhanced reception with different directionality, as discussed above with reference to FIG. 14B. In the usage illustrated in FIG. 14C, the first microphone 1402-1 and the second microphone 1402-2 may be used together as an end-fire array to form a reception beam 1404-1, the first microphone 1402-1 and the third microphone 1402-3 may be used together as an end-fire array to form a reception beam 1404-2; the second microphone 1402-2 and the fourth microphone 1402-4 may be used together as an end-fire array to form a reception beam 1404-3; the third microphone 1402-3 and the fourth microphone 1402-4 may be used together as an end-fire array to form a reception beam 1404-4; the first microphone 1402-1 and the fourth microphone 1402-4 may be used together as an end-fire array to form a reception beam 1404-5; the first microphone 1402-1 and the second microphone 1402-2 may (also) be used together as an end-fire array to form a reception beam 1404-6; the first microphone 1402-1 and the third microphone 1402-3 may (also) be used together as an end-fire array to form a reception beam 1404-7; and the first microphone 1402-1 and the fourth microphone 1402-4 may (also) be used together as an end-fire array to form a reception beam 1404-8. When the array 1400 is positioned in the center of an 8-passenger vehicle, for example, the reception beam 1404-1 may be directed to the right rear (RR) seat, the reception beam 1404-2 may be directed to the left rear (LR) seat, the reception beam 1404-3 may be directed to the right middle (RM) seat, the reception beam 1404-4 may be directed to the left middle (LM) seat, the reception beam 1404-5 may be directed to the center rear (CR) seat, the reception beam 1404-6 may be directed to the left front (LR) seat, the reception beam 1404-7 may be directed to the right front (RF) seat, and the reception beam 1404-8 may be directed to the center middle seat (not labeled in FIG. 14C for ease of illustration, but located between the LM and RM seats), as shown. Thus, the array 1400 of FIG. 14C may enable directional reception in at least eight different directions using only four microphones 1402.

FIG. 14D is a plan view of another usage of the four-microphone array 1400 of FIGS. 14B and 14C, in accordance with some embodiments. In the array 1400 of FIG. 14D, as in the array 1400 of FIG. 14B, a first microphone 1402-1, a second microphone 1402-2, and a third microphone 1402-3 are positioned so as to provide the vertices of a triangle in a plan view of the array 1400. A fourth microphone 1402-4 is positioned "within" this triangle. As shown in FIG. 14D, the four microphones 1402 of the array 1400 may provide the vertices of a concave shape.

Different pairs of the microphones 1402 of FIG. 14D may be used together to provide end-fire arrays forming "beams" of enhanced reception with different directionality, as discussed above with reference to FIG. 14B. In the usage illustrated in FIG. 14D, the first microphone 1402-1 and the second microphone 1402-2 may be used together as an end-fire array to form a reception beam 1404-1, the first microphone 1402-1 and the third microphone 1402-3 may be used together as an end-fire array to form a reception beam 1404-2; the second microphone 1402-2 and the fourth microphone 1402-4 may be used together as an end-fire array to form a reception beam 1404-3; the third microphone 1402-3 and the fourth microphone 1402-4 may be used together as an end-fire array to form a reception beam 1404-4; the first microphone 1402-1 and the fourth microphone 1402-4 may be used together as an end-fire array to form a reception beam 1404-5; the fourth microphone 1402-4 and the second microphone 1402-2 may (also) be used together as an end-fire array to form a reception beam 1404-6; the fourth microphone 1402-4 and the third microphone 1402-3 may (also) be used together as an end-fire array to form a reception beam 1404-7; and the first microphone 1402-1 and the fourth microphone 1402-4 may (also) be used together as an end-fire array to form a reception beam 1404-8. When the array 1400 is positioned in the center of an 8-passenger vehicle, for example, the reception beam 1404-1 may be directed to the right rear (RR) seat, the reception beam 1404-2 may be directed to the left rear (LR) seat, the reception beam 1404-3 may be directed to the right middle (RM) seat, the reception beam 1404-4 may be directed to the left middle (LM) seat, the reception beam 1404-5 may be directed to the center rear (CR) seat, the reception beam 1404-6 may be directed to the left front (LR) seat, the reception beam 1404-7 may be directed to the right front (RF) seat, and the reception beam 1404-8 may be directed to the center middle seat (not labeled in FIG. 14D for ease of illustration, but located between the LM and RM seats), as shown. Thus, the array 1400 of FIG. 14D may also enable directional reception in at least eight different directions using only four microphones 1402.

In the embodiments of FIGS. 14B, 14C, and 14D, the distance 1406-1 between the first microphone 1402-1 and the second microphone 1402-2 may be the same as the distance 1406-2 between the first microphone 1402-1 and the third microphone 1402-3. In other embodiments, the distance 1406-1 and the distance 1406-2 of the array 1400 of FIG. 14B, 14C, or 14D may be different; any of the asymmetric embodiments discussed below with reference to FIG. 15 may apply here. Similarly, the distance 1406-3 between the second microphone 1402-2 and the fourth microphone 1402-4 may be the same as the distance 1406-4 between the third microphone 1402-3 and the fourth microphone 1402-4. In other embodiments, the distance 1406-3 and the distance 1406-4 of the array 1400 of FIG. 14B, 14C, or 14D may be different; any of the asymmetric embodiments discussed below with reference to FIG. 15 may apply here.

FIG. 15 is a plan view of another four-microphone array 1400, in accordance with some embodiments. In the array 1400 of FIG. 15, as in the array 1400 of FIG. 14A, a first microphone 1402-1, a second microphone 1402-2, and a third microphone 1402-3 are positioned so as to provide the vertices of a triangle in a plan view of the array 1400. A fourth microphone 1402-4 is positioned "within" this triangle. As shown in FIG. 15, the four microphones 1402 of the array 1400 may provide the vertices of a concave shape.

Different pairs of the microphones 1402 of FIG. 15 may be used together to provide end-fire arrays forming "beams" of enhanced reception with different directionality, as discussed above with reference to FIG. 14A. For example, the first microphone 1402-1 and the second microphone 1402-2 may be used together as an end-fire array to form a reception beam 1404-1, the first microphone 1402-1 and the third microphone 1402-3 may be used together as an end-fire array to form a reception beam 1404-2; the second microphone 1402-2 and the fourth microphone 1402-4 may be used together as an end-fire array to form a reception beam 1404-3; the third microphone 1402-3 and the fourth microphone 1402-4 may be used together as an end-fire array to form a reception beam 1404-4; and the first microphone 1402-1 and the fourth microphone 1402-4 may be used together as an end-fire array to form a reception beam 1404-5. When the array 1400 is positioned in the dashboard of a vehicle, for example, the reception beam 1404-1 may be directed to the left rear (LR) seat, the reception beam 1404-2 may be directed to the right rear (RR) seat, the reception beam 1404-3 may be directed to the left front (LF) seat, the reception beam 1404-4 may be directed to the right front (RF) seat, and the reception beam 1404-5 may be directed to the center rear (CR) seat, as shown. Thus, like the array 1400 of FIG. 14A, the array 1400 of FIG. 15 may enable directional reception in at least five different directions using only four microphones 1402.

In the embodiment of FIG. 15, the distance 1406-1 between the first microphone 1402-1 and the second microphone 1402-2 is different from the distance 1406-2 between the first microphone 1402-1 and the third microphone 1402-3. In particular, in FIG. 15, the distance 1406-1 is less than the distance 1406-2. Similarly, the distance 1406-3 between the second microphone 1402-2 and the fourth microphone 1402-4 is different from the distance 1406-4 between the third microphone 1402-3 and the fourth microphone 1402-4. In particular, in FIG. 15, the distance 1406-3 is less than the distance 1406-4. As shown in FIG. 15, the arrangement of the microphones 1402 in the array 1400 is not symmetric about any axis.

An asymmetric arrangement like the array 1400 of FIG. 15 may be desirable in applications in which the array 1400 will not be placed in a central position relative to all of the locations of interest. For example, in a vehicle, detection of the driver's voice may be higher priority than detection of the voices of the other passengers (e.g., because of voice commands or other information provided by the driver). Consequently, it may be desirable to have the microphones 1402-2 and 1402-4 (providing the end-fire array used to detect audio arising from the left front seat) closer to the left front seat to limit the decay in the power of the driver's speech between the driver and the microphones 1402-2 and 1402-4, increasing the amplitude of the speech detected at the microphones 1402-2 and 1402-4 and potentially improving performance. In vehicles where the driver's seat is the right front seat, or when the speech of interest arises from the right front seat (e.g., when the passenger in that seat is a navigator), the array 1400 of FIG. 15 may be flipped horizontally.

Figure 16A:
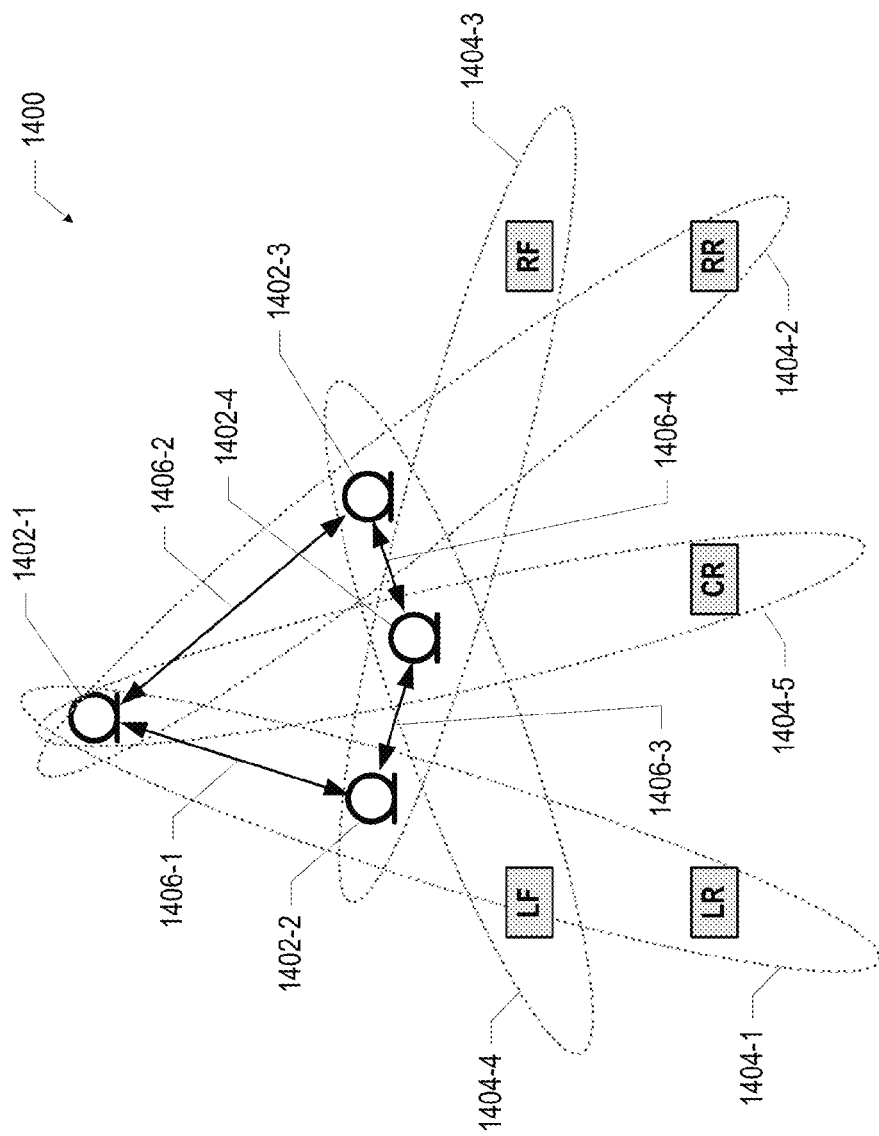

FIG. 16A is a plan view of another four-microphone array 1400, in accordance with some embodiments. In the array 1400 of FIG. 16A, a first microphone 1402-1, a second microphone 1402-2, and a third microphone 1402-3 are positioned so as to provide the vertices of a triangle in a plan view of the array 1400. A fourth microphone 1402-4 is positioned "outside" this triangle. As shown in FIG. 16A, the four microphones 1402 of the array 1400 may provide the vertices of an asymmetric, convex shape. The distance 1406-1 between the first microphone 1402-1 and the second microphone 1402-2 is different from the distance 1406-2 between the first microphone 1402-1 and the third microphone 1402-3. In particular, in FIG. 16A, the distance 1406-1 is less than the distance 1406-2. Similarly, the distance 1406-3 between the second microphone 1402-2 and the fourth microphone 1402-4 is different from the distance 1406-4 between the third microphone 1402-3 and the fourth microphone 1402-4. In particular, in FIG. 16A, the distance 1406-3 is greater than the distance 1406-4. As shown in FIG. 16A, the arrangement of the microphones 1402 in the array 1400 is not symmetric about any axis.

As discussed above with reference to FIGS. 14 and 15, different pairs of the microphones 1402 of FIG. 16A may be used together to provide end-fire arrays forming "beams" of enhanced reception with different directionality. For example, the first microphone 1402-1 and the second microphone 1402-2 may be used together as an end-fire array to form a reception beam 1404-1, the first microphone 1402-1 and the third microphone 1402-3 may be used together as an end-fire array to form a reception beam 1404-2; the second microphone 1402-2 and the fourth microphone 1402-4 may be used together as an end-fire array to form a reception beam 1404-3; the third microphone 1402-3 and the fourth microphone 1402-4 may be used together as an end-fire array to form a reception beam 1404-4; and the first microphone 1402-1 and the fourth microphone 1402-4 may be used together as an end-fire array to form a reception beam 1404-5. When the array 1400 is positioned in the dashboard of a vehicle, for example, the reception beam 1404-1 may be directed to the left rear (LR) seat, the reception beam 1404-2 may be directed to the right rear (RR) seat, the reception beam 1404-3 may be directed to the right front (RF) seat, the reception beam 1404-4 may be directed to the left front (LF) seat, and the reception beam 1404-5 may be directed to the center rear (CR) seat, as shown. Thus, like the arrays 1400 of FIGS. 14 and 15, the array 1400 of FIG. 16A may enable directional reception in at least five different directions using only four microphones 1402.

Figure 16B:
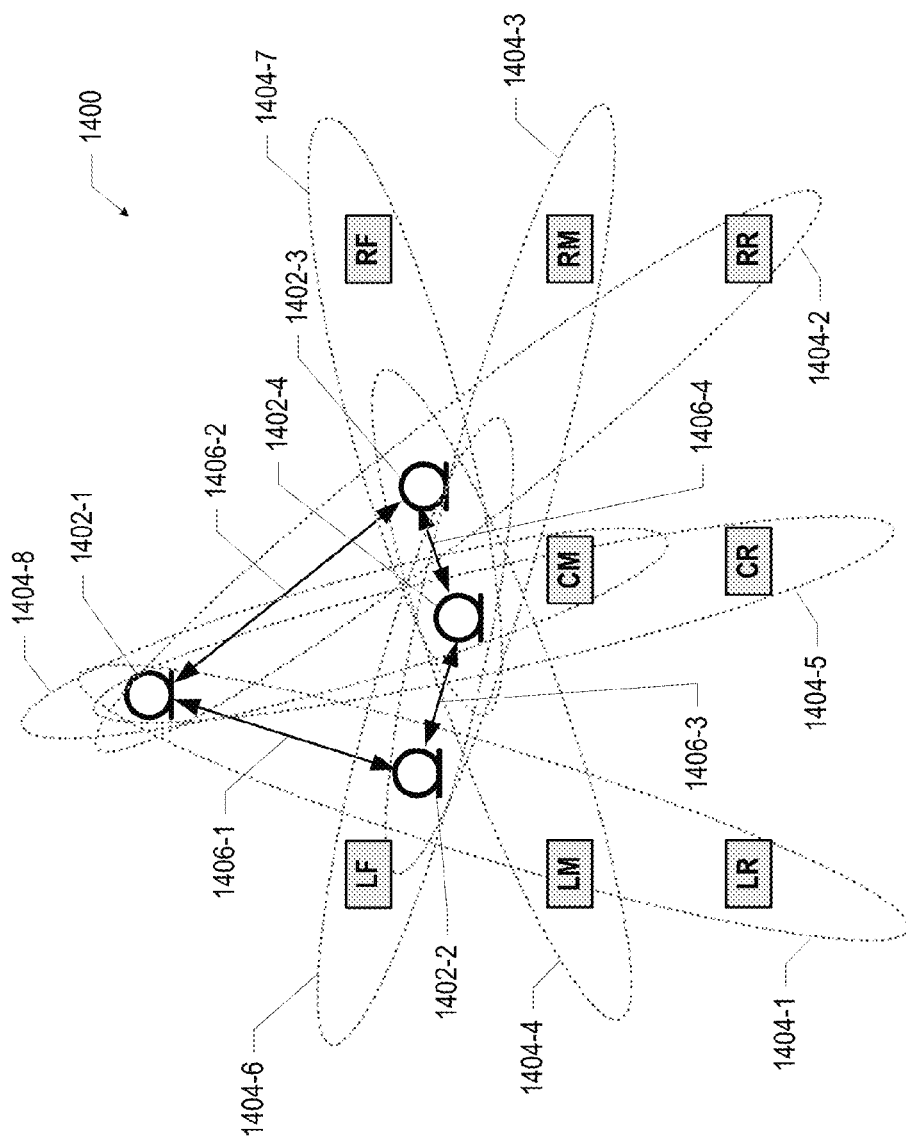

FIG. 16B is a plan view of another usage of the four-microphone array 1400 of FIG. 16A, in accordance with some embodiments. In the array 1400 of FIG. 16B, as in the array 1400 of FIG. 16A, a first microphone 1402-1, a second microphone 1402-2, and a third microphone 1402-3 are positioned so as to provide the vertices of a triangle in a plan view of the array 1400. A fourth microphone 1402-4 is positioned "outside" this triangle. As shown in FIG. 16B, the four microphones 1402 of the array 1400 may provide the vertices of an asymmetric, convex shape. The distance 1406-1 between the first microphone 1402-1 and the second microphone 1402-2 is different from the distance 1406-2 between the first microphone 1402-1 and the third microphone 1402-3.

Different pairs of the microphones 1402 of FIG. 16B may be used together to provide end-fire arrays forming "beams" of enhanced reception with different directionality, as discussed above with reference to FIG. 16A. In the usage illustrated in FIG. 16B, the first microphone 1402-1 and the second microphone 1402-2 may be used together as an end-fire array to form a reception beam 1404-1, the first microphone 1402-1 and the third microphone 1402-3 may be used together as an end-fire array to form a reception beam 1404-2; the second microphone 1402-2 and the fourth microphone 1402-4 may be used together as an end-fire array to form a reception beam 1404-3; the third microphone 1402-3 and the fourth microphone 1402-4 may be used together as an end-fire array to form a reception beam 1404-4; the first microphone 1402-1 and the fourth microphone 1402-4 may be used together as an end-fire array to form a reception beam 1404-5; the second microphone 1402-2 and the fourth microphone 1402-4 may (also) be used together as an end-fire array to form a reception beam 1404-6; the third microphone 1402-3 and the fourth microphone 1402-4 may (also) be used together as an end-fire array to form a reception beam 1404-7; and the first microphone 1402-1 and the fourth microphone 1402-4 may (also) be used together as an end-fire array to form a reception beam 1404-8. When the array 1400 is positioned proximate to the front of an 8-passenger vehicle, for example (as illustrated), the reception beam 1404-1 may be directed to the left rear (LR) seat, the reception beam 1404-2 may be directed to the right rear (RR) seat, the reception beam 1404-3 may be directed to the right middle (RM) seat, the reception beam 1404-4 may be directed to the left middle (LM) seat, the reception beam 1404-5 may be directed to the center rear (CR) seat, the reception beam 1404-6 may be directed to the left front (LF) seat, the reception beam 1404-7 may be directed to the right front (RF) seat, and the reception beam 1404-8 may be directed to the center middle (CM) seat, as shown. Thus, like the arrays 1400 of FIGS. 14C-D, the array 1400 of FIG. 16B may enable directional reception in at least eight different directions using only four microphones 1402.

As discussed above with reference to FIG. 15, an asymmetric arrangement like the array 1400 of FIGS. 16A and 16B may be desirable in applications where the array 1400 will not be placed in a central position relative to all of the locations of interest. The embodiment of FIGS. 16A and 16B may be used in any of the manners discussed with reference to the embodiment of FIG. 15. The footprint of the array 1400 of FIGS. 16A and 16B may be larger than the footprint of the arrays 1400 of FIGS. 14A-D and 15, but the additional "interior" space in the array 1400 of FIGS. 16A and 16B may be used for circuitry related to the use of the array 1400 (e.g., as discussed below with reference to FIG. 17).

In some embodiments, it may be useful to utilize certain combinations of the microphones 1402 to form reception beams other than those explicitly discussed above. For example, the microphones 1402-2 and 1402-3 of any of the embodiments disclosed herein may be used as a broadside array.

In some embodiments, the microphones 1402 and an array 1400 may not all be disposed in a common plane, but may be arranged at different "heights" with respect to each other. For example, if one of the microphones 1402 is disposed on the surface of a substrate (e.g., printed circuit board), another of the microphones 1402 may be disposed in a recess in the surface of the substrate or may be elevated with respect to the surface of the substrate (e.g., on an interposer or other projection extending away from the surface of the substrate). The directionality of the beams 1404 may thus also be adjusted in the third dimension by positioning the microphones 1402 at different relative heights, as desired.

Figure 17:
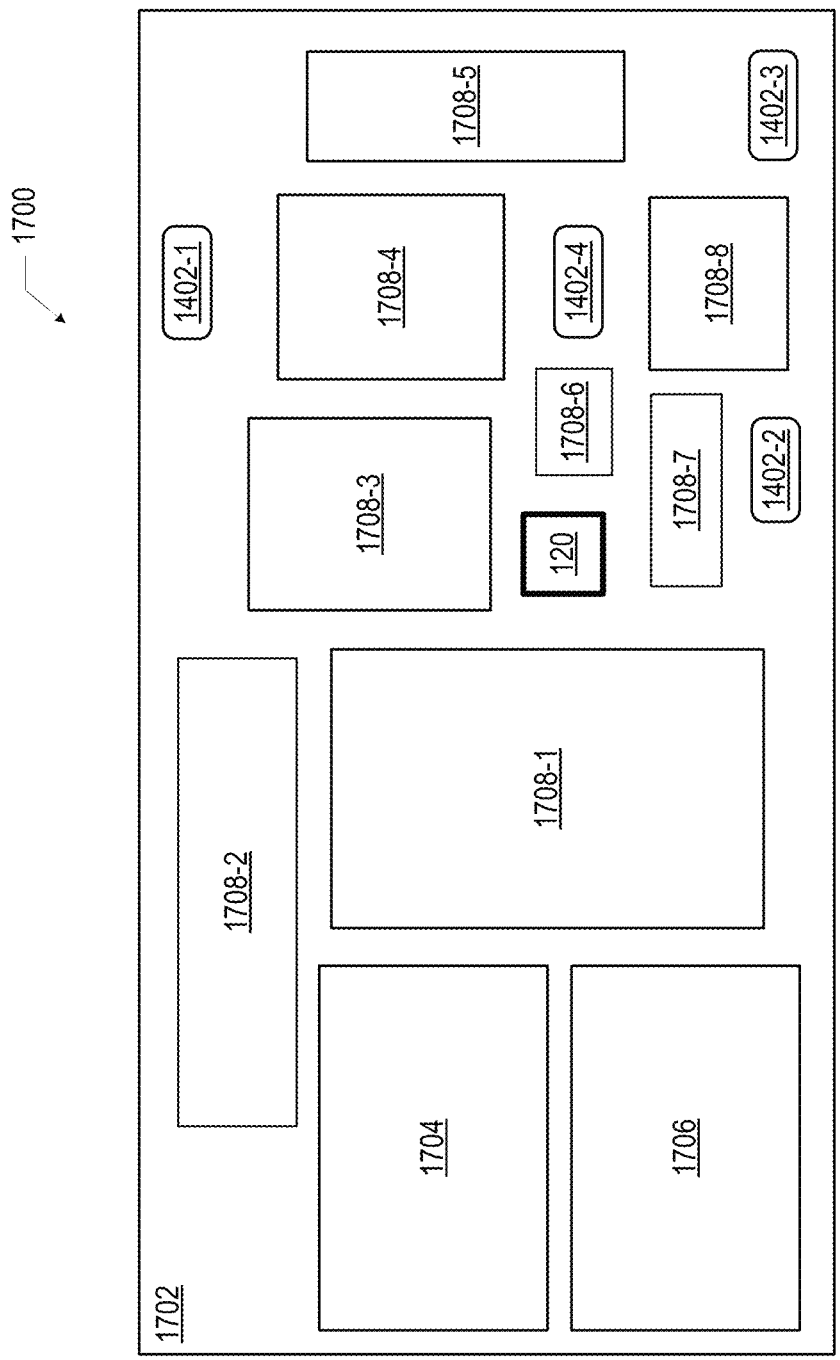
FIG. 17 is a plan view of a microphone array apparatus that may include any of the four-microphone arrays disclosed herein, in accordance with various embodiments.

In some embodiments, all of the microphones 1402 may be coupled to a common substrate. In some such embodiments, a communications device (such as the node transceiver 120) may also be coupled to the substrate, along with appropriate electrical traces and support circuitry. For example, FIG. 17 is a plan view of a microphone array apparatus 1700 that may include any of the four-microphone arrays 1400 disclosed herein, in accordance with various embodiments. The array 1400 of FIG. 14A is illustrated in FIG. 17, but this is simply an example, and any of the arrays 1400 disclosed herein may be included in the apparatus 1700.

The apparatus 1700 may include a substrate 1702 on which the microphones 1402 of the array 1400 are mounted. As noted above, in embodiments where different ones of the microphones 1402 are to have different "elevations" with respect to the surface of the substrate 1702, the substrate 1702 may include recesses or projections to accommodate these elevations (and/or, in some embodiments, intervening structures, such as interposers, may be used). The substrate 1702 may be a printed circuit board, a flex circuit, or a combined rigid/flex circuit, for example. The node transceiver 120 may also be mounted on the substrate 1702, and the microphones 1402 may serve as the devices 155 or 157 discussed above with reference to FIG. 2. Example embodiments in which the microphones 1402 are coupled to the node transceiver 120 as devices 155 are discussed below with reference to FIG. 18. In some embodiments, the node transceiver 120 may be configured to phase align the sampling point of different ones of the microphones 1402; when multiple apparatuses 1700 are coupled together along the bus 106, different ones of the apparatus may phase align the sampling points of the microphones 1402 coupled to different transceivers 120.

Support circuitry 1708 may also be mounted on the substrate 1702. The support circuitry 1708 may support the operation of the node transceiver 120 and/or the microphones 1402, or may provide other functions (e.g., wireless communication from the apparatus 1700 to another device, diagnostic or other data for being displayed on a monitor or touchscreen, etc.). Examples of the support circuitry 1708 may include the upstream filtering circuitry 132 and the downstream filtering circuitry 131 discussed above with reference to FIG. 2, but the support circuitry 1708 may include any passive components, active components, processing devices, memory components, communication components, energy storage components, etc. A number of different areas for support circuitry 1708 (indicated as 1708-1 through 1708-8) may be used; in some embodiments one or more of the support circuitry 1708-1 through 1708-8 may not be used. In particular, support circuitry 1708 may be disposed between different ones of the microphones 1402, and between different ones of the microphones 1402 and the node transceiver 120.

An upstream connector 1704 and a downstream connector 1706 may be mounted on the substrate 1702, and may provide two-wire upstream and two-wire downstream connection points, respectively, for the node transceiver 120 to upstream and downstream segments of the bus 106. In some embodiments, the upstream connector 1704 may be physically separate from the downstream connector 1706 (e.g., two different sockets), while in other embodiments, the upstream connector 1704 and the downstream connector 1706 may be a combined connector (e.g., a common socket to which a multi-wire cable connects), and the upstream and downstream electrical pathways may separate outside of the apparatus 1700. In some embodiments, the upstream connector 1704 and/or the downstream connector 1706 may be located at the ends of cables whose other ends are physically coupled to the substrate 1702. For example, the bare wires at one end of a pigtail cable may be soldered to the substrate 1702 (e.g., a PCB), and the connector at the other end of the pigtail cable may provide the upstream connector 1704. The same may be true for the downstream connector 1706. In some embodiments, a pigtail cable used to couple to the upstream connector 1704 (or the downstream connector 1706) may be a coax cable.

The apparatus 1700 may include conventional PCB design features not illustrated in FIG. 17. For example, the surface of the substrate 1702 may include printed information and/or status lights or buzzers, and mounting holes may extend through the substrate 1702. In some embodiments, all of the components illustrated in FIG. 17 may be mounted to one face of a PCB, while in other embodiments, components may be mounted to both opposing faces of a PCB.

The overall dimensions of the substrate 1702 may depend on the dimensions of the array 1400 and the other components coupled to the substrate 1702. In some embodiments, the substrate 1702 may be a 30 millimeter by 60 millimeter PCB, but the substrate 1702 may be smaller or larger (e.g., 20-50 millimeters by 40-80 millimeters). The microphones 1402 may be relatively low profile (e.g., having a height of 3 millimeters or less, such as 1 millimeter) and may have a footprint of 3-5 millimeters by 2-4 millimeters, for example.

Multiple ones of the apparatus 1700 may be included as nodes along the bus 106 of the system 100. For example, one apparatus 1700 may be positioned at the front of a vehicle (e.g., in the dashboard) and another apparatus 1700 may be positioned at the rear of the vehicle, and the two apparatus 1700 may be distributed as slave nodes 104 along the bus 106. Any of the microphone arrays 1400 disclosed herein (e.g., in the form of the apparatus 1700) may be positioned at any suitable location. For example, in a vehicle, an array 1400 may be located in or on the internal rear view mirror, in or on a housing for an emergency call or sunroof device, in or on a light button or light fixture, or in or on a headliner.

In some embodiments, the apparatus 1700 may be included in a housing (not shown) made of a conductive material (e.g., a metal or a conductive plastic) that acts as an electromagnetic shield for the components therein. In other embodiments, the apparatus 1700 may be included in a housing made at least in part of a non-conductive material (e.g., a non-conductive plastic). In some embodiments, the substrate 1702 may include a flooded layer (e.g., a flooded layer of a PCB) that may act as an electromagnetic shield. For example, components of the apparatus 1700 (e.g., bottom hole microphones) may only be disposed on one face of the substrate 1702, with that face of the substrate 1702 shielded by a vehicle chassis and the other side shielded by a flooded layer.

In some embodiments, the microphones 1402 of an array 1400 may communicate with the I2S/TDM/PDM transceiver 127 included in the node transceiver 120 (discussed above with reference to FIG. 2). In particular, the microphones 1402 may generate digital PDM data that may be provided to the I2S/TDM/PDM transceiver 127, encoded for the bus 106 by the bus protocol circuitry 126, and sent upstream and/or downstream by the upstream DS transceiver circuitry 122 and/or the downstream DS transceiver circuitry 124, respectively, in accordance with any of the embodiments disclosed herein. FIG. 18 is a schematic illustration of connections between the microphones 1402 of a four-microphone array 1400 and the node transceiver 120 of FIG. 2, in accordance with various embodiments. The arrangement of FIG. 18 may be included in the apparatus 1700 of FIG. 17, for example, and the physical arrangement of the microphones 1402 in FIG. 18 may take any of the forms discussed above with reference to FIGS. 14-16.

Each of the microphones 1402 in FIG. 18 may include a reference voltage input (VDD) and a ground (GND). In some embodiments, as illustrated in FIG. 18, the reference voltage input may be provided by the VIN pin of the node transceiver 102. As discussed above, in some embodiments, power may be provided to the VIN pin via a DC bias on the bus 106 (and the upstream filtering circuitry 132/downstream filtering circuitry 131), and thus the microphones 1402 may also be powered by the DC bias on the bus 106. In other embodiments, the microphones 1402 may be powered separately from the node transceiver 120 (e.g., via one or more batteries or other power sources).

Each of the microphones 1402 may include a clock input (CLK) and a data output (DATA). The node transceiver 120 may provide a clock signal to the clock inputs of all of the microphones 1402 from the BCLK pin of the node transceiver 120. Each of the microphones 1402 may provide PDM data to the DRX pins of the node transceiver 120. In particular, the microphones 1402-1 and 1402-2 may share the pin DRX[0], and the microphones 1402-3 and 1402-4 may share the pin DRX[1]. The microphone 1402-1 may provide its data to DRX[0] on the rising edge of the clock signal, and the microphone 1402-2 may provide its data to DRX[0] on the falling edge of the clock signal (or vice versa). The microphone 1402-3 may provide its data to DRX[1] on the rising edge of the clock signal, and the microphone 1402-4 may provide its data to DRX[1] on the falling edge of the clock signal (or vice versa).

Although FIG. 18 depicts a particular assignment of the different microphones 1402 to the pins DRX[0] and DRX[1], and to rising and falling edges, this is simply illustrative, and the microphones 1402 may share DRX[0] or DRX[1], or utilize rising or falling edges, in any desired combination. Additionally, although FIG. 18 depicts microphones 1402 that output data in PDM format, the outputs of the microphones 1402 may be analog (e.g., and converted to digital by ADCs disposed between the microphones 1402 and the node transceiver 120) or in another digital format (e.g., I2S). In some embodiments, one BCLK signal may be shared between all of the microphones 1402-1 to 1402-4; in other embodiments, two BCLK signals may be shared between two microphones 1402 each, or individual BCLK signals may be used for each microphone 1402.

As noted above, FIG. 19 is a block diagram of a microphone 1402 that may be included in any of the four-microphone arrays 1400 disclosed herein, in accordance with various embodiments. The microphone 1402 of FIG. 19 has a digital output and includes a transducer 1902 (and, optionally, an amplifier) whose output is converted to digital values by the ADC 1904, encoded using PDM by the PDM modulator 1906, and output at the DATA pin. The PDM encoding utilizes a clock signal provided to the CLK pin. The microphone 1402 may also include power management circuitry 1908 to power the microphone array 1400. In embodiments where the microphone 1402 of an array 1400 outputs I2S data instead of PDM data, the microphone 1402 may further include a decimation filter and I2S serial port between the PDM modulator 1906 and the DATA pin, as known in the art. When the microphone 1402 is a MEMS microphone, the microphone 1402 may further include a hole 1910 in the package through which acoustic energy passes to the transducer 1902.

Figure 20:
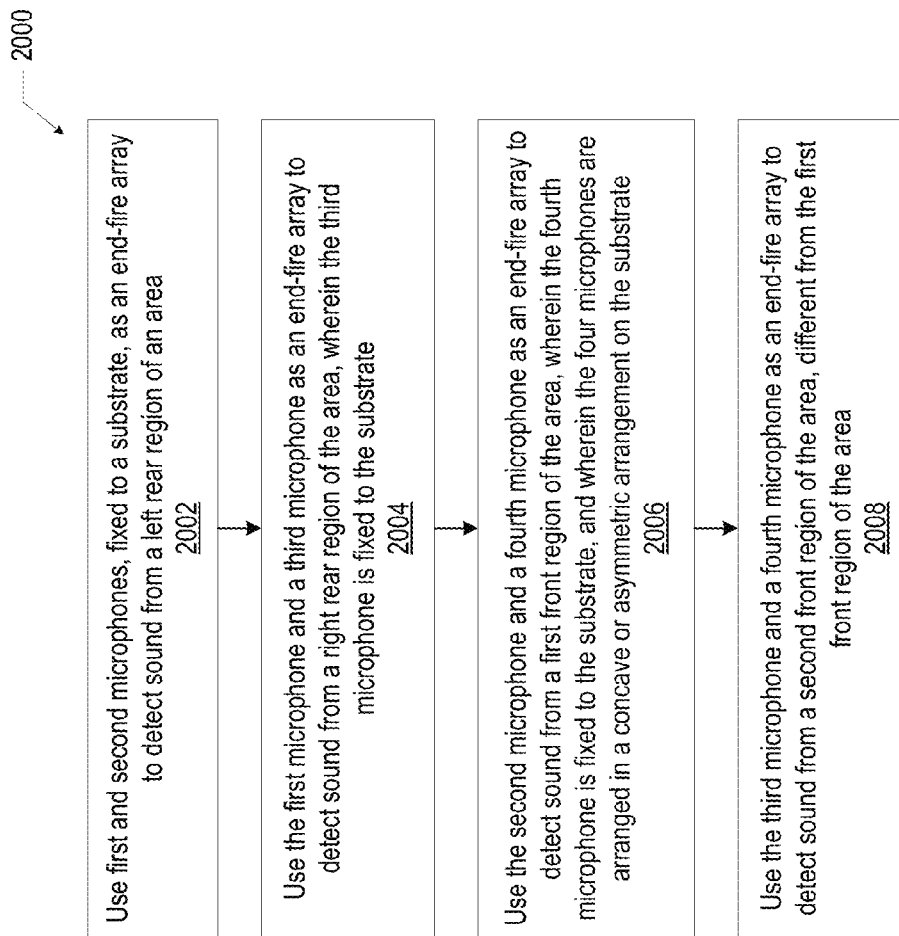
FIG. 20 is a flow diagram of a method of directional signal reception, in accordance with various embodiments.

FIG. 20 is a flow diagram of a method 2000 of directional signal reception, in accordance with various embodiments. In some embodiments, the host 110 may perform the operations of the method 2000 using data generated by microphones 1402 that are peripheral devices 108 of one or more slave nodes 104. This is simply an illustrative embodiment, and any suitable device may perform the method 2000. As noted above, the references to "left," "right," "front," and "rear" in the discussion of the method 2000 are relative terms, and are to be applied relative to the positioning of the microphones used in the method.

At 2002, first and second microphones, fixed to a substrate, may be used as an end-fire array to detect sound from a left rear region of an area.

At 2004, the first microphone and a third microphone may be used as an end-fire array to detect sound from a right rear region of the area. The third microphone may also be fixed to the substrate.

At 2006, the second microphone and a fourth microphone may be used as an end-fire array to detect sound from a first front region of the area. The fourth microphone may also be fixed to the substrate, and the four microphones may be arranged in a concave or asymmetric arrangement on the substrate.

At 2008, the third microphone and the fourth microphone may be used as an end-fire array to detect sound from a second front region of the area, different from the first front region of the area. For example, the first front region may be a left front passenger seat of a vehicle, and the second front region may be a right front passenger seat of a vehicle (or vice versa).

The data generated by any of the microphone arrays disclosed herein may be processed by any one suitable device(s) in the system 100, as discussed above, using any suitable technique(s). For example, signals from broadside and end-fire aligned microphones may also be processed as a combined array to gain benefit from both implementations and improve directionality; that is, both broadside and end-fire array processing techniques may be applied to signals received at a microphone array. Noise cancellation techniques may be performed by using the directionality of the microphones towards a desired sound source and intentionally also as a separate source towards a noise interferer. Signal processing techniques performed using any of the microphone arrays disclosed herein may include active beam steering, and maximum ratio combining and source separation techniques. In some embodiments, subsets of any of the microphone arrays disclosed herein may use individual frequency equalization, individual signal delay or frequency dependent delay. Beamforming and other signal processing of the data generated by the microphones 1402 may be performed by processing resources of the apparatus 1700, at a different node on the system 100 (e.g. at the master node 102 or another slave node 104), at the host 110, or distributed over different devices (e.g., by the apparatus 1700 and another node, or by multiple nodes, or by the host 110 and one or more nodes).

The following paragraphs provide various examples of some of the embodiments disclosed herein.

Example 1 is a four-microphone array for directional signal reception, including: first, second, and third microphones arranged such that projections of the first, second, and third microphones in a plane provide corners of a triangle in the plane; and a fourth microphone arranged such that a projection of the fourth microphone in the plane is disposed in an interior of the triangle.

Example 2 may include the subject matter of Example 1, and may further include control circuitry to utilize different pairs of the four microphones as different end-fire arrays.

Example 3 may include the subject matter of any of Examples 1-2, and may further specify that: the first and second microphones provide an end-fire array directed to a left rear seat of a vehicle; and the first and third microphones provide an end-fire array directed to a right rear seat of the vehicle.

Example 4 may include the subject matter of Example 3, and may further specify that: the second and fourth microphones provide an end-fire array directed to a left front seat of the vehicle; and the third and fourth microphones provide an end-fire array directed to a right front seat of the vehicle.

Example 5 may include the subject matter of any of Examples 3-4, and may further specify that the first and fourth microphones provide an end-fire array directed to a center rear seat of the vehicle.

Example 6 may include the subject matter of any of Examples 1-5, and may further specify that a distance between the first microphone and the second microphone is different from a distance between the first microphone and the third microphone.

Example 7 may include the subject matter of Example 6, and may further specify that the four-microphone array is disposed in a vehicle, the distance between the first microphone and the second microphone is less than the distance between the first microphone and the third microphone, and a left front seat of the vehicle is closer to the second microphone than to the third microphone.

Example 8 may include the subject matter of Example 7, and may further specify that a distance between the second microphone and the fourth microphone is less than a distance between the third microphone and the fourth microphone.

Example 9 may include the subject matter of any of Examples 6-7, and may further specify that a distance between the second microphone and the fourth microphone is different from a distance between the third microphone and the fourth microphone.

Example 10 may include the subject matter of any of Examples 1-9, and may further specify that a distance between any pair of the four microphones is less than 50 millimeters.

Example 11 may include the subject matter of any of Examples 1-10, and may further specify that a distance between any pair of the four microphones is less than 30 millimeters.

Example 12 may include the subject matter of any of Examples 1-11, and may further specify that each of the four microphones is a microelectromechanical systems (MEMS) microphone.

Example 13 may include the subject matter of any of Examples 1-12, and may further specify that at least one of the four microphones is communicatively coupled to a communications device, the communications device is coupled to a two-wire bus, and the communications device is in communication with at least one upstream device over the two-wire bus.

Example 14 may include the subject matter of Example 13, and may further specify that the communications device includes: upstream transceiver circuitry to receive a first signal transmitted over the two-wire bus from an upstream device and to provide a second signal over the two-wire bus to the upstream device; downstream transceiver circuitry to provide a third signal downstream over the two-wire bus toward a downstream device and to receive a fourth signal over the two-wire bus from the downstream device; and clock circuitry to generate a clock signal at the communications device based on the first signal, wherein timing of receipt and provision of signals over the two-wire bus by the communications device is based on the clock signal.

Example 15 may include the subject matter of Example 14, and may further specify that the clock circuitry is to generate the clock signal based on a preamble of a synchronization control frame in the first signal.

Example 16 may include the subject matter of any of Examples 13-15, and may further specify that all of the four microphones are communicatively coupled to the communications device.

Example 17 may include the subject matter of Example 16, and may further specify that all of the four microphones are wired to the communications device.

Example 18 may include the subject matter of any of Examples 13-17, and may further specify that all of the four microphones are mounted to a common circuit board with the communications device.

Example 19 may include the subject matter of any of Examples 1-18, and may further specify that all of the four microphones are wired to a transceiver, and all of the four microphones and the transceiver are mounted to a common circuit board.

Example 20 may include the subject matter of any of Examples 1-19, and may further specify that at least one of the four microphones is disposed at a distance from the plane that is different from the distance from the plane of at least one other of the four microphones.

Example 21 may include the subject matter of any of Examples 1-20, and may further specify that the four microphones are mounted to a substrate and no additional microphones are mounted to the substrate.

Example 22 is a four-microphone array for directional signal reception, including: first, second, and third microphones arranged such that projections of the first, second, and third microphones in a plane provide corners of a triangle in the plane; and a fourth microphone arranged such that a projection of the fourth microphone in the plane is disposed outside an interior of the triangle; wherein a distance between the first microphone and the second microphone is different from a distance between the first microphone and the third microphone.

Example 23 may include the subject matter of Example 22, and may further include control circuitry to utilize different pairs of the four microphones as different end-fire arrays.

Example 24 may include the subject matter of any of Examples 22-23, and may further specify that: the first and second microphones provide an end-fire array directed to a left rear seat of a vehicle; and the first and third microphones provide an end-fire array directed to a right rear seat of the vehicle.

Example 25 may include the subject matter of Example 24, and may further specify that: the second and fourth microphones provide an end-fire array directed to a right front seat of the vehicle; and the third and fourth microphones provide an end-fire array directed to a left front seat of the vehicle.

Example 26 may include the subject matter of Example 25, and may further specify that the first and fourth microphones provide an end-fire array directed to a center rear seat of the vehicle.

Example 27 may include the subject matter of any of Examples 22-26, and may further specify that the four-microphone array is disposed in a vehicle, the distance between the first microphone and the second microphone is less than the distance between the first microphone and the third microphone, and a left front seat of the vehicle is closer to the second microphone than to the third microphone.

Example 28 may include the subject matter of Example 27, and may further specify that a distance between the second microphone and the fourth microphone is less than a distance between the third microphone and the fourth microphone.

Example 29 may include the subject matter of any of Examples 26-28, and may further specify that a distance between the second microphone and the fourth microphone is different from a distance between the third microphone and the fourth microphone.

Example 30 may include the subject matter of any of Examples 22-29, and may further specify that a distance between any pair of the four microphones is less than 50 millimeters.

Example 31 may include the subject matter of any of Examples 22-30, and may further specify that a distance between any pair of the four microphones is less than 30 millimeters.

Example 32 may include the subject matter of any of Examples 22-31, and may further specify that each of the four microphones is a microelectromechanical systems (MEMS) microphone.

Example 33 may include the subject matter of any of Examples 22-32, and may further specify that at least one of the four microphones is communicatively coupled to a communications device, the communications device is coupled to a two-wire bus, and the communications device is in communication with at least one upstream device over the two-wire bus.

Example 34 may include the subject matter of Example 33, and may further specify that the communications device includes: upstream transceiver circuitry to receive a first signal transmitted over the two-wire bus from an upstream device and to provide a second signal over the two-wire bus to the upstream device; downstream transceiver circuitry to provide a third signal downstream over the two-wire bus toward a downstream device and to receive a fourth signal over the two-wire bus from the downstream device; and clock circuitry to generate a clock signal at the communications device based on the first signal, wherein timing of receipt and provision of signals over the two-wire bus by the communications device is based on the clock signal.

Example 35 may include the subject matter of Example 34, and may further specify that the clock circuitry is to generate the clock signal based on a preamble of a synchronization control frame in the first signal.

Example 36 may include the subject matter of any of Examples 33-35, and may further specify that all of the four microphones are communicatively coupled to the communications device.

Example 37 may include the subject matter of Example 36, and may further specify that all of the four microphones are wired to the communications device.

Example 38 may include the subject matter of any of Examples 33-37, and may further specify that all of the four microphones are mounted to a common circuit board with the communications device.

Example 39 may include the subject matter of any of Examples 22-38, and may further specify that all of the four microphones are wired to a transceiver, and all of the four microphones and the transceiver are mounted to a common circuit board.

Example 40 may include the subject matter of any of Examples 22-39, and may further specify that at least one of the four microphones is disposed at a distance from the plane that is different from the distance from the plane of at least one other of the four microphones.

Example 41 may include the subject matter of any of Examples 22-40, and may further specify that the four microphones are mounted to a substrate and no additional microphones are mounted to the substrate.

Example 42 is a method of directional signal reception, including: using first and second microphones, fixed to a substrate, as an end-fire array to detect sound from a left rear region of an area; using the first microphone and a third microphone as an end-fire array to detect sound from a right rear region of the area, wherein the third microphone is fixed to the substrate; using the second microphone and a fourth microphone as an end-fire array to detect sound from a first front region of the area, wherein the fourth microphone is fixed to the substrate; and using the third microphone and the fourth microphone as an end-fire array to detect sound from a second front region of the area, different from the first front region of the area; wherein the four microphones are arranged in a concave or asymmetric arrangement on the substrate.

Example 43 may include the subject matter of Example 42, and may further specify that the area is a cabin of a vehicle.

Example 44 may include the subject matter of Example 43, and may further specify that the vehicle is a road vehicle.

Example 45 may include the subject matter of any of Examples 42-44, and may further include using the first and fourth microphones as an end-fire array to detect sound from a center rear region of the area.

Example 46 may include the subject matter of any of Examples 42-45, and may further specify that the substrate is a circuit board.

Example 47 may include the subject matter of any of Examples 42-46, and may further specify that a distance between the first microphone and the second microphone is less than a distance between the first microphone and the third microphone, and the first front region is closer to the second microphone than to the third microphone.

Example 48 may include the subject matter of any of Examples 42-47, and may further specify that a distance between the second microphone and the fourth microphone is less than a distance between the third microphone and the fourth microphone.

Example 49 may include the subject matter of any of Examples 42-48, and may further specify that a distance between any pair of the four microphones is less than 30 millimeters.

Example 50 may include the subject matter of any of Examples 42-49, and may further specify that each of the four microphones is a microelectromechanical systems (MEMS) microphone.

Example 51 may include the subject matter of any of Examples 42-50, and may further specify that the first front region of the area is a left front region and the second front region of the area is a right front region.

Example 52 may include the subject matter of any of Examples 42-50, and may further specify that the first front region of the area is a right front region and the second front region of the area is a left front region.

Example 53 may include the subject matter of any of Examples 42-52, and may further include transmitting data from the four microphones to a communications device, wherein the communications device is coupled to a two-wire bus, and the communications device is in communication with at least one upstream device over the two-wire bus.

Example 54 may include the subject matter of Example 53, and may further include transmitting the data from the four microphones, by the communications device to the upstream device over the two-wire bus.

Example 55 may include the subject matter of any of Examples 53-54, and may further include: generating, by the communications device, a clock signal at the communications device based on a signal received over the two-wire bus from the upstream device, wherein timing of receipt and provision of signals over the two-wire bus by the communications device is based on the clock signal.

Example 56 may include the subject matter of Example 55, and may further specify that generating the clock signal based on the signal comprises generating the clock signal based on a preamble of a synchronization control frame in the signal.

Example 57 may include the subject matter of any of Examples 53-56, and may further specify that transmitting the data from the four microphones to the communications device comprises providing pulse density modulated data to the communications device.

Example 58 may include the subject matter of any of Examples 53-57, and may further specify that all of the four microphones are wired to the communications device.

Example 59 may include the subject matter of any of Examples 53-58, and may further specify that all of the four microphones are mounted to a common circuit board with the communications device.

Example 60 is one or more non-transitory computer readable medium having instructions thereon that, in response to execution by one or more processing devices of a computing system, cause the computing system to perform the method of any of Examples 42-59.

Example 61 may include the subject matter of any of Examples 1-60, and may further specify that the four-microphone array is to generate reception beams in at least 8 different directions.

Example 61 may include the subject matter of any of Examples 1-61, and may further specify that the four-microphone array is to generate reception beams directed to seat locations in an 8-passenger vehicle.

The invention claimed is:

1. A four-microphone array for directional signal reception, comprising:
    first, second, and third microphones arranged such that mathematical projections of the first, second, and third microphones in a plane provide corners of a triangle in the plane; and
    a fourth microphone arranged such that a mathematical projection of the fourth microphone in the plane is disposed in an interior of the triangle;
    wherein the four microphones are mounted to a substrate and no additional microphones are mounted to the substrate.

2. The four-microphone array of claim 1, further comprising:
    control circuitry to utilize different pairs of the four microphones as different end-fire arrays.

3. The four-microphone array of claim 2, wherein:
    the first and second microphones are to provide an end-fire array directed to a left rear seat of a vehicle;
    the first and third microphones are to provide an end-fire array directed to a right rear seat of the vehicle;
    the second and fourth microphones are to provide an end-fire array directed to a left front seat of the vehicle; and
    the third and fourth microphones are to provide an end-fire array directed to a right front seat of the vehicle.

4. The four-microphone array of claim 1, wherein:
    a distance between the first microphone and the second microphone is different from a distance between the first microphone and the third microphone.

5. The four-microphone array of claim 1, wherein the four-microphone array is disposed in a vehicle, a distance between the first microphone and the second microphone is less than a distance between the first microphone and the third microphone, and a left front seat of the vehicle is closer to the second microphone than to the third microphone.

6. The four-microphone array of claim 1, wherein a distance between the second microphone and the fourth microphone is different from a distance between the third microphone and the fourth microphone.

7. The four-microphone array of claim 1, wherein at least one of the four microphones is communicatively coupled to a communications device, the communications device is coupled to a two-wire bus, and the communications device is in communication with at least one upstream device over the two-wire bus.

8. The four-microphone array of claim 7, wherein the communications device includes:
    upstream transceiver circuitry to receive a first signal transmitted over the two-wire bus from an upstream device and to provide a second signal over the two-wire bus to the upstream device;
    downstream transceiver circuitry to provide a third signal downstream over the two-wire bus toward a downstream device and to receive a fourth signal over the two-wire bus from the downstream device; and
    clock circuitry to generate a clock signal at the communications device based on the first signal, wherein timing of receipt and provision of signals over the two-wire bus by the communications device is based on the clock signal.

9. The four-microphone array of claim 1, wherein all of the four microphones are wired to a transceiver, and all of the four microphones and the transceiver are mounted to a common circuit board.

10. The four-microphone array of claim 1, wherein at least one of the four microphones is disposed at a first distance from the plane, another of the four microphones is disposed at a second distance from the plane, and the first distance is different from the second distance.

11. The four-microphone array of claim 1, wherein a distance between any pair of the four microphones is less than 50 millimeters.

12. A method of directional signal reception, comprising:
    using first and second microphones, fixed to a substrate, as an end-fire array to detect sound from a left rear region of an area;
    using the first microphone and a third microphone as an end-fire array to detect sound from a right rear region of the area, wherein the third microphone is fixed to the substrate;
    using the second microphone and a fourth microphone as an end-fire array to detect sound from a first front region of the area, wherein the fourth microphone is fixed to the substrate; and using the third microphone and the fourth microphone as an end-fire array to detect sound from a second front region of the area, different from the first front region of the area;

wherein the four microphones are arranged such that mathematical projections of the first, second, and third microphones in a plane provide corners of a triangle in the plane, mathematical projection of the fourth microphone in the plane is disposed in an interior of the triangle, at least one of the four microphones is disposed at a first distance from the plane, another of the four microphones is disposed at a second distance from the plane, and the first distance is different from the second distance.

13. The method of claim 12, wherein the area is a cabin of a vehicle.

14. The method of claim 12, further comprising:
transmitting data from the four microphones to a communications device, wherein the communications device is coupled to a two-wire bus, and the communications device is in communication with at least one upstream device over the two-wire bus.

15. A four-microphone array for directional signal reception, comprising:
first, second, and third microphones arranged such that mathematical projections of the first, second, and third microphones in a plane provide corners of a triangle in the plane; and
a fourth microphone arranged such that a mathematical projection of the fourth microphone in the plane is disposed in an interior of the triangle;
wherein a distance between the first microphone and the second microphone is different from a distance between the first microphone and the third microphone.

16. The four-microphone array of claim 15, wherein at least one of the four microphones is disposed at a first distance from the plane, another of the four microphones is disposed at a second distance from the plane, and the first distance is different from the second distance.

17. The four-microphone array of claim 15, wherein at least one of the four microphones is communicatively coupled to a communications device, the communications device is coupled to a two-wire bus, and the communications device is in communication with at least one upstream device over the two-wire bus.

18. The four-microphone array of claim 17, wherein the communications device includes:
upstream transceiver circuitry to receive a first signal transmitted over the two-wire bus from an upstream device and to provide a second signal over the two-wire bus to the upstream device;
downstream transceiver circuitry to provide a third signal downstream over the two-wire bus toward a downstream device and to receive a fourth signal over the two-wire bus from the downstream device; and
clock circuitry to generate a clock signal at the communications device based on the first signal, wherein timing of receipt and provision of signals over the two-wire bus by the communications device is based on the clock signal.

19. A four-microphone array for directional signal reception, comprising:
first, second, and third microphones arranged such that mathematical projections of the first, second, and third microphones in a plane provide corners of a triangle in the plane; and
a fourth microphone arranged such that a mathematical projection of the fourth microphone in the plane is disposed in an interior of the triangle;
wherein at least one of the four microphones is communicatively coupled to a communications device, the communications device is coupled to a two-wire bus, and the communications device is in communication with at least one upstream device over the two-wire bus; and
wherein the communications device includes:
upstream transceiver circuitry to receive a first signal transmitted over the two-wire bus from an upstream device and to provide a second signal over the two-wire bus to the upstream device;
downstream transceiver circuitry to provide a third signal downstream over the two-wire bus toward a downstream device and to receive a fourth signal over the two-wire bus from the downstream device; and
clock circuitry to generate a clock signal at the communications device based on the first signal, wherein timing of receipt and provision of signals over the two-wire bus by the communications device is based on the clock signal.

20. The four-microphone array of claim 19, wherein at least one of the four microphones is disposed at a first distance from the plane, another of the four microphones is disposed at a second distance from the plane, and the first distance is different from the second distance.

* * * * *